United States Patent
Sato et al.

(10) Patent No.: US 8,497,426 B2
(45) Date of Patent: Jul. 30, 2013

(54) WIRE HARNESS

(75) Inventors: Osamu Sato, Yokkaichi (JP); Atsushi Murata, Yokkaichi (JP); Makoto Kamiya, Yokkaichi (JP); Satoshi Tanigawa, Yokkaichi (JP); Shinichi Igarashi, Yokkaichi (JP); Nobumasa Takihara, Yokkaichi (JP); Yukihiro Shirafuji, Yokkaichi (JP); Masamichi Yamagiwa, Yokkaichi (JP); Yutaka Takata, Yokkaichi (JP); Hiroto Ueno, Yokkaichi (JP)

(73) Assignees: Autonetworks Technologies, Ltd. (JP); Sumitomo Wiring Systems, Ltd. (JP); Sumitomo Electric Industries, Ltd. (JP)

( * ) Notice: Subject to any disclaimer, the term of this patent is extended or adjusted under 35 U.S.C. 154(b) by 0 days.

(21) Appl. No.: 13/521,899

(22) PCT Filed: Apr. 26, 2011

(86) PCT No.: PCT/JP2011/060127
§ 371 (c)(1),
(2), (4) Date: Sep. 11, 2012

(87) PCT Pub. No.: WO2012/008199
PCT Pub. Date: Jan. 19, 2012

(65) Prior Publication Data
US 2013/0014988 A1    Jan. 17, 2013

(30) Foreign Application Priority Data

Jul. 12, 2010 (JP) ................................ 2010-157677
Jul. 12, 2010 (JP) ................................ 2010-157851

(51) Int. Cl.
*H02G 3/04* (2006.01)
(52) U.S. Cl.
USPC ..... 174/72 A; 174/70 C; 174/68.1; 174/70 R; 248/49; 248/68.1

(58) Field of Classification Search
USPC ................ 174/72 A, 72 C, 68.1, 74 R, 72 R, 174/73.1, 70 R, 71 R, 110 R, 110 F, 70 C; 361/826, 827; 211/26; 248/49, 51, 68.1
See application file for complete search history.

(56) References Cited

U.S. PATENT DOCUMENTS

| | | | |
|---|---|---|---|
| 6,060,663 A * | 5/2000 | Hier et al. | 174/110 F |
| 6,444,903 B2 * | 9/2002 | Saeki et al. | 174/480 |
| 7,045,709 B2 * | 5/2006 | Koike et al. | 174/480 |
| 8,188,368 B2 * | 5/2012 | Suzuki | 174/72 A |

* cited by examiner

FOREIGN PATENT DOCUMENTS

| | | |
|---|---|---|
| JP | 2003-197038 | 7/2003 |
| JP | 2010-92621 | 4/2010 |
| JP | 2010-267412 | 11/2010 |

OTHER PUBLICATIONS

Office Action of Jun. 26, 2012 for Japanese Patent Appl. No. 2012-520859.

*Primary Examiner* — Angel R Estrada
(74) *Attorney, Agent, or Firm* — Gerald E. Hespos; Michael J. Porco; Matthew T. Hespos

(57) ABSTRACT

A wire harness has an exterior component (11a) that covers a certain part of at least one wires (12). The exterior component (11a) has parts having different hardness, including a relatively hard first part (111a), a relatively soft second part (112a), and a third part (113a) having an intermediate hardness between that of the first parts (111a, 112a). The first part is formed on a surface of the exterior component and functions as a shape keeping member and a protector. The second and third parts (112a, 113a) surround the certain part of the at least one wire 12 and each functions as a cushioning material and a muffler/soundproofing material. The first part (111a), the second part (112a), and the third part (113a) are formed integrally from a non-woven fabric (2) with thermo plasticity.

9 Claims, 12 Drawing Sheets

11a, 11b, 11c, 11d, 11e, 11f 1a, 1b, 1c, 1d, 1e, 1f

WIRE HARNESS

BACKGROUND OF THE INVENTION

1. Field of the Invention

The present invention relates to wire harnesses and, in detail, to a wire harness having a part of a wire or a bundle of wires provided with an exterior component covering this wire or bundle of wires and the exterior component.

2. Description of the Related Art

Inside a vehicle such as an automobile, wire harnesses for electrically connecting electric devices, electronics, and others to each other are routed. A general wire harness includes a certain number and a certain type of wires. And, these wires are gathered, and the gathered wires form a main line or a branch line of the wire harness. At an end of a wire or a bundle of wires of the wire harness (that is, an end of the main line or the branch line), a certain type of connector is mounted.

Furthermore, at a certain part of the wire or the bundle of wires of the wire harness, a certain exterior component may be provided. For example, in order to prevent the bundle of wires from coming apart, a resin tape may be coiled around the bundle of wires or a corrugated tube may be mounted. Also, in order to protect the wire or the bundle of wires, a protector may be mounted. Furthermore, in order to keep the wire or the bundle of wires in a certain shape (for example, a shape of a path for routing), a shape keeping member may be provided.

As such, an exterior component having a certain function, such as a resin tape, a corrugated tube, a protector, or a shape keeping member may be provided to the wire or the bundle of wires of the wire harness. However, the wire harness as described above has the following problems.

First, if the number of exterior components to be provided to the wire or the bundle of wires of the wire harness and the number of types of such exterior components are large, it takes trouble to manage these exterior components and the materials of the exterior components. Also, details of operations for mounting these exterior components on the wire or the bundle of wires of the wire harness may vary depending on the type or structure. For this reason, the type of process for manufacturing the wire harness is increased, thereby possibly inviting an increase in manufacturing cost.

Moreover, if the structure is such that an injection-molded product is mounted on the wire or the bundle of wires of the wire harness, since a molding tool for manufacturing an injection-molded product is generally expensive, an increase in manufacturing cost may be invited. Furthermore, in the structure in which a resin tape is coiled around the wire or the bundle of wires of the wire harness, it takes a long time for operation.

Meanwhile, an example of a structure in which a member other than an injection-molded product and a resin tape is mounted on a wire or a bundle of wires of a wire harness is disclosed in JP 2003-197038 A. The structure described in JP 2003-197038 is schematically described as follows. First, a flat circuit body is interposed between two coating members made of a thermoplastic material, and these are pressurized by a mold as being heated. With this two coating members are brought into close contact with the flat circuit body and two coating members are welded to each other. According to this structure, two coating members made of the thermoplastic material serve as a protector that protects the flat circuit body.

However, in the structure described in JP 2003-197038, it is difficult to solve the problems described above. That is, while the structure described in JP 2003-197038 can be applied to a protector for a flat circuit body, it cannot be applied to other bundles of wires (for example, a bundle of wires with its section being formed in an approximately circular shape). As such, the applicable structure of the bundle of wires is restricted, and therefore a non-applicable wire or a bundle of wires requires a conventional protector. Also, since a non-woven fabric is easily-deformable material, in the structure described in JP 2003-197038, it is difficult to keep the flat circuit body in a certain shape. That is, it is difficult to apply the structure described in JP 2003-197038 to a shape keeping member. For this reason, in order to keep the shape of the wire or the bundle of wires in a certain shape, a separate shape keeping member is required. As such, in the structure described in JP 2003-197038, it is difficult to decrease the number of types of members to be mounted on the wire or the bundle of wires. Therefore, it is difficult to reduce trouble of managing these members, prevent or suppress an increase in product price, reduce the number of process in the manufacturing process and simplify details of operation, and reduce manufacturing time.

SUMMARY OF INVENTION

The problems will be solved by the present invention by providing a wire harness capable of reducing trouble of managing an exterior member mounted so as to cover a wire or a bundle of wires, providing a wire harness capable of achieving a reduction in number of types of material of this exterior member (capable of achieving commonality of member materials), achieving a reduction in the number of processes, simplification of details of operation, commonality of the processes in manufacturing this wire harness, and achieving a reduction in manufacturing time. Furthermore, the problems will be solved by providing an exterior component for this wire harness.

To solve the problems described above, the wire harness according to the present invention is summarized as including a wire or a bundle of wires and an exterior component provided in such a manner that it covers a certain part of the wire or the bundle of wires, wherein the exterior component has a part having a certain hardness and a part which is softer than the part having a certain hardness which are formed integrally from an identical material.

Here, a preferable structure is such that the part having a certain hardness is formed on the surface of the exterior component and the wire or the bundle of wires is surrounded by the part which is softer.

Also, a structure in which the exterior component is formed from a non-woven fabric consisting of thermoplastic materials can be applied.

The non-woven fabric having a base fiber and a binder fiber can be applied. And, a structure can be applied in which the base fiber consists of a thermoplastic resin material having a certain melting point, the binder fiber has a core fiber and a binder component layer formed on the circumference of the core fiber, the core fiber consists of a thermoplastic resin material having a certain melting point, and the binder component layer consists of a thermoplastic resin material whose melting point is lower than the melting points of the base fiber and the core fiber.

A structure can be applied in which in the part having a certain hardness the base fiber and the core fiber of the binder fiber are bound by the binder component and also wherein the densities of the base fiber and the core fiber of the binder fiber are higher when compared with the part which is softer.

On the other hand, an exterior component of the present invention is summarized as being capable of accommodating a wire or a bundle of wire of a wire harness, wherein a part having a certain hardness and a part which is softer than the part having a certain hardness are formed integrally from an identical material.

As described above, the structure in which the exterior component is formed from a non-woven fabric consisting of thermoplastic materials can be applied.

The structure can be applied in which the non-woven fabric having a base fiber and a binder fiber, the base fiber consists of a thermoplastic resin material having a certain melting point, the binder fiber has a core fiber and a binder component layer formed on the circumference of the core fiber, the core fiber consists of a thermoplastic resin material having a certain melting point, and the binder component layer consists of a thermoplastic resin material whose melting point is lower than the melting points of the base fiber and the core fiber.

The structure can be applied in which in the part having a certain hardness the base fiber and the core fiber of the binder fiber are bound by the binder component and also wherein the densities of the base fiber and the core fiber of the binder fiber are higher when compared with the part which is softer.

According to the wire harness and the exterior component for the wire harness of the present invention, the exterior component has a part having a certain hardness and a part which is softer than a part having the certain hardness, the parts formed integrally from an identical material. That is, in the exterior component, a relatively hard part and a relatively soft part are integrally formed from an identical material. For this reason, with the relatively hard part and soft part respectively having certain functions, the exterior component can have the respective certain functions. For this reason, the exterior component having functions different from each other can be formed from an identical material, and therefore exterior components having different use purposes or functions can be formed from a common material. Therefore, a reduction in the number of types of material of the exterior component can be achieved (=commonality of materials can be achieved). With this, a reduction in trouble of managing the material of the exterior component can be achieved. Furthermore, the number of types of exterior component to be provided to the wire harness can be reduced. For this reason, the price of the wire harness can be reduced.

Also, according to the present invention, the exterior component of the wire harness can be formed only by pressurizing a non-woven fabric while heating. Thus, compared with a structure of applying an injection-molded product, a reduction in manufacturing cost can be achieved. Also, compared with a structure of coiling a resin tape, a reduction in manufacturing time can be achieved. Furthermore, since exterior components having functions different from each other can be formed from an identical material, exterior components having different use purpose or functions can be formed with a common process. Therefore, commonality of processes can be achieved.

Furthermore, according to the present invention, in the exterior component, a relatively hard part and a relatively soft part are integrally formed from an identical material. For this reason, the exterior component can have a plurality of functions. For example, the relatively hard part can be provided with a function of a shape keeping member or a protector, and the relatively soft part can be provided with a function of a cushioning material, a muffler/soundproofing material, or a heat insulating material. For this reason, for example, a shape keeping member having a muffler/soundproofing function can be formed from one type of material. With this, a reduction in the number of processes in manufacturing the wire harness and simplification of details of operation can be achieved. Also, a reduction in time required for manufacturing can be achieved.

Still further, according to the present invention, the part having the certain hardness of the exterior component has a function of keeping a certain part of the wire or the bundle of wires (that is, a certain part of a main line or a branch line of the wire harness) in a certain shape. For this reason, with the certain part of the wire or the bundle of wires being formed in a shape of a region in which the part is routed, a reduction in trouble of operation of routing the wire harness can be achieved. Also, since the certain part of the wire or the bundle of wires is kept in the certain shape, the number of clamps for fixing the certain part to a member where routing is to be made can be reduced. With this, a reduction in the number of components can be achieved, and a reduction in the number of operations of routing can also be achieved.

DETAILED DESCRIPTION OF THE PREFERRED EMBODIMENTS

Wire harnesses according to respective embodiments of the present invention are described below.

Figure 1:
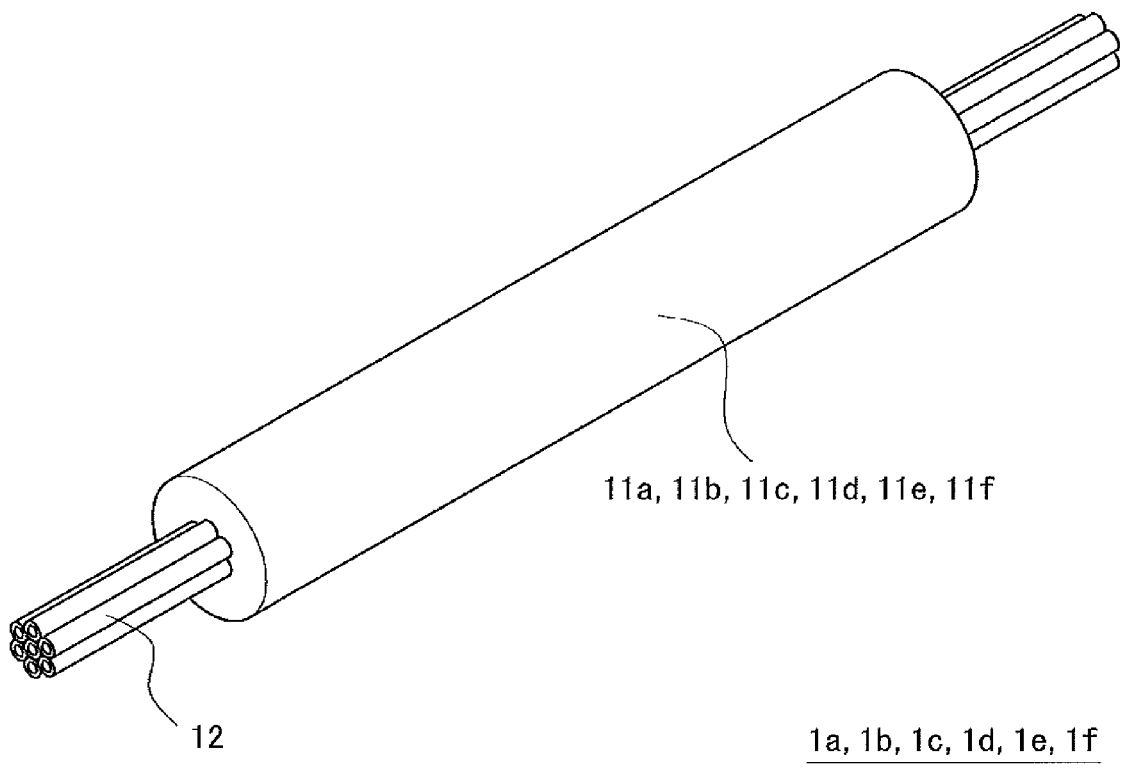
FIG. 1 is an external perspective view showing a certain part (=a part where an exterior component is provided) of a wire harness according to each embodiment of the present invention as being extracted.
Figure 2A:
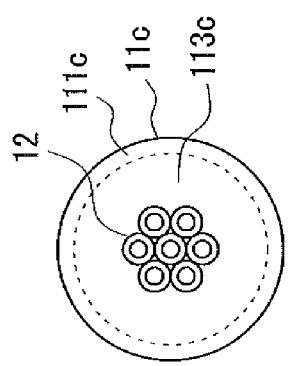
FIG. 2 shows sectional views each schematically showing a sectional structure of the certain part of the wire harness according to each of these embodiments, FIG. 2(a) showing a wire harness according to a first embodiment, FIG. 2(b) showing a wire harness according to a second embodiment, FIG. 2(c) showing a wire harness according to a third embodiment, FIG. 2(d) showing a wire harness according to a fourth embodiment, FIG. 2(e) showing a wire harness according to a fifth embodiment, and FIG. 2(f) showing a wire harness according to a sixth embodiment.
Figure 2D:
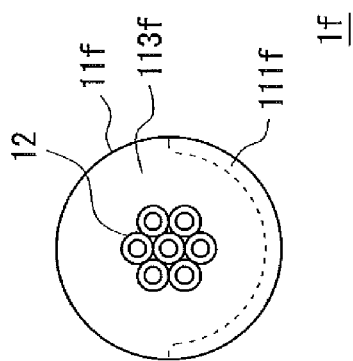
Figure 2B:
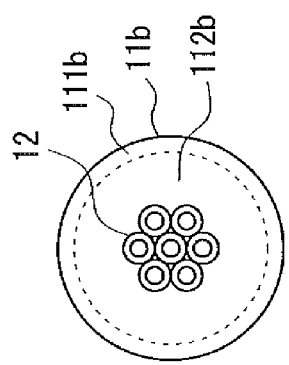
Figure 2E:
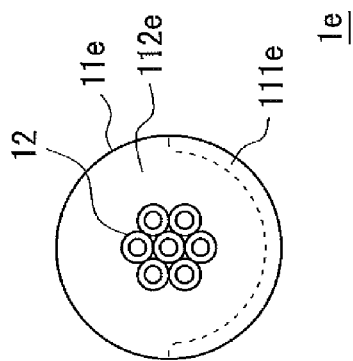
Figure 2C:
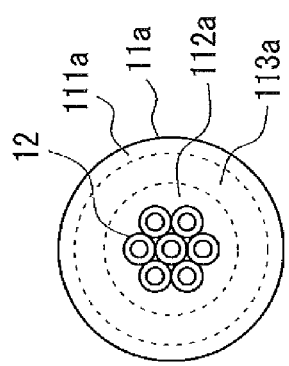
Figure 2F:
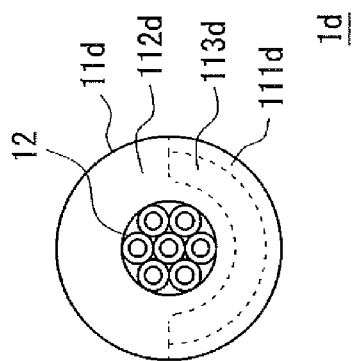

FIG. 1 is an external perspective view showing a certain part (=a part where a certain member 11a, 11b, 11c, 11d, 11e, or 11f is provided) of a relevant one of wire harnesses 1a, 1b, 1c, 1d, 1e, and 1f according to the respective embodiments of the present invention as being extracted. FIG. 2 shows sectional views each schematically showing a sectional structure of a certain part of a relevant one of the wire harnesses 1a, 1b, 1c, 1d, 1e, and 1f according to the respective embodiments of the present invention. Specifically, FIG. 2(a) shows the wire harness 1a according to a first embodiment of the present invention, FIG. 2(b) shows the wire harness 1b according to a second embodiment of the present invention, FIG. 2(c) shows the wire harness 1c according to a third embodiment of the present invention, FIG. 2(d) shows the wire harness 1d according to a fourth embodiment of the present invention, FIG. 2(e) shows the wire harness 12 according to a fifth embodiment of the present invention, and FIG. 2(f) shows the wire harness 1f according to a sixth embodiment of the present invention.

First, a common structure of the wire harnesses 1a, 1b, 1c, 1d, 1e, and 1f according to the respective embodiments of the present invention is described. The wire harnesses 1a, 1b, 1c, 1d, 1e, and 1f according to the respective embodiments of the present invention each include a certain type and a certain number of wires 12. And, the certain type and the certain number of these wires 12 are gathered in a certain form, and each wire 12 or the bundle of gathered wires 12 serve as a main line or a branch line of a relevant one of the wire harnesses 1a, 1b, 1c, 1d, 1e, and 1f according to the respective embodiments of the present invention. At an end of the wire 12 or the bundle of wires 12 (that is, an end of the main line or the branch line of the relevant one of the wire harnesses 1a, 1b, 1c, 1d, 1e, and 1f according to the respective embodiments of the present invention), a certain type of connector or the like is mounted.

Note that the number and type of wires 12 included in each of the wire harnesses 1a, 1b, 1c, 1d, 1e, and 1f according to the respective embodiments of the present invention, the type and structure of connector mounted at the end of the wire 12 or the bundle of wires 12, and the length and branching form of the main line and the branch line of the wire harnesses 1a, 1b, 1c, 1d, 1e, and 1f according to the respective embodiments of the present invention are not particularly restricted. These are set as appropriate according to the function and use purpose of the wire harnesses 1a, 1b, 1c, 1d, 1e, and 1f according to the respective embodiments of the present invention and the dimensions and shape of a space where wires are routed.

And, as shown in each of FIG. 1 and FIG. 2, to a certain part of the wire 12 or the bundle of wires of a relevant one of the wire harnesses 1a, 1b, 1c, 1d, 1e, and 1f according to the respective embodiments of the present invention, a relevant one of the certain exterior components 11a, 11b, 11c, 11d, 11e, and 11f is provided. The certain exterior components 11a, 11b, 11c, 11d, 11e, and 11f are members each provided so as to cover the circumference of the certain part of the wire 12 or the bundle of wires 12. In particular, as shown in FIG. 1 and FIG. 2, the certain exterior components 11a, 11b, 11c, 11d, 11e, and 11f each preferably have a structure of being provided to cover the circumference of the certain part of the wire 12 or the bundle of wires 12 without clearance. In other words, the certain part of the wire 12 or the bundle of wires 12 is preferably configured not to be exposed from the relevant one of the exterior components 11a, 11b, 11c, 11d, 11e, and 11f.

Note that while the structure is shown in FIG. 1 and FIG. 2 in which each of the exterior components 11a, 11b, 11c, 11d, 11e, and 11f is provided to the "bundle of wires 12" in which the plurality of wires are gathered, the structure may be such that each of the exterior components 11a, 11b, 11c, 11d, 11e, and 11f is provided to a single wire 12.

The exterior components 11a, 11b, 11c, 11d, 11e, and 11f each have one or a plurality of functions of (1) a function of protecting the wire 12 or the bundle of wires 12 (=a function of a "protector"), (2) a function of keeping the shape of the wire 12 or the bundle of wires 12 (=the shape of the main line or the branch line of a relevant one of the wire harnesses 1a, 1b, 1c, 1d, 1e, and 1f according to the respective embodiments of the present invention) in a certain shape (=a function of a "shape keeping member"), (3) a function of preventing or suppressing the occurrence of an unusual noise (a function of a "muffler" or a "soundproofing material"), (4) a function of preventing or suppressing transmission of heat to the wire 12 or the bundle of wires 12 (a function of a "heat insulating material"), (5) a function of preventing a shock from being given to the wire 12 or the bundle of wires 12 (a function of a "cushioning material"), and (6) a function of gathering the bundle of wires 12 to prevent them from coming apart (a function of a "binding material").

Among the wire 12 or the bundle of wires 12 (=among the main line and the branch line of a relevant one of the wire harnesses 1a, 1b, 1c, 1d, 1e, and 1f according to the respective embodiments of the present invention), the position and range where a relevant one of the exterior components 11a, 11b, 11c, 11d, 11e, and 11f is provided are not particularly restricted. Also, the dimensions and shape of each of the exterior components 11a, 11b, 11c, 11d, 11e, and 11f are not particularly restricted. These are set as appropriate according to the function to be provided to each of the exterior components 11a, 11b, 11c, 11d, 11e, and 11f and the dimensions and shape of a region where a part to which a relevant one of the exterior components 11a, 11b, 11c, 11d, 11e, and 11f is provided is routed (for example, an inner space of an automobile or the like). For example, a structure can be applied in which the shape and dimensions of each of the exterior components 11a, 11b, 11c, 11d, 11e, and 11f are identical to the shape and dimensions of the region where the part to which a relevant one of the exterior components 11a, 11b, 11c, 11d, 11e, and 11f is provided is routed or are approximately identical to the shape of the region.

In each of the exterior components 11a, 11b, 11c, 11d, 11e, and 11f, parts having different hardnesses are formed. In other words, a part having a certain hardness and a part which is softer than the part having the certain hardness are formed.

In the exterior components 11a and 11d of the wire harnesses 1a and 1d according to the first embodiment and the fourth embodiment of the present invention, respectively, parts of three types having different hardnesses are formed. Relatively hardest parts (=the "parts having the certain hardness") are referred to as "first parts 111a and 111d". Relatively softest parts (=the "parts softer than the parts having the certain hardness") are referred to as "second parts 112a and 112d". Parts having an intermediate hardness between that of the "first parts 111a and 111d" and that of the "second parts 112a and 112d" (the parts also correspond to the "parts softer than the parts having the certain hardness") are referred to as "third parts 113a and 113d".

In the exterior components 11b and 11e of the wire harnesses 1b and 1e according to the second embodiment and the fifth embodiment of the present invention, respectively, parts of two types having different hardnesses are formed. Relatively hard parts (=the "parts having the certain hardness") are referred to as "first parts 111b and 111e". Relatively soft parts (=the "parts softer than the parts having the certain hardness") are referred to as "second parts 112b and 112e". Similarly, in the exterior components 11c and 11f of the wire harnesses 1c and 1f according to the third embodiment and the sixth embodiment of the present invention, respectively, parts of two types having different hardnesses are formed. Relatively hard parts (=the "parts having the certain hardness") are referred to as "first parts 111c and 111f". Relatively soft parts (=the "parts softer than the parts having the certain hardness") are referred to as "third parts 113c and 113f".

And, when the exterior components 11a and 11d of the wire harnesses 1a and 1d according to the first embodiment and the fourth embodiment of the present invention are cut in a direction at a right angle with respect to an axis line direction of the wire 12 or the bundle of wires 12, the first parts 111a and 111d, the second parts 112a and 112d, and the third parts 113a and 113d appear on their sections. When the exterior components 11b and 11e of the wire harnesses 1b and 1e according to the second embodiment and the fifth embodiment of the present invention are cut in a similar manner, the first parts 111b and 111e and the second parts 112b and 112e appear on their sections. When the exterior components 11c and 11f of the wire harnesses 1c and 1f according to the third embodiment and the sixth embodiment of the present invention are cut in a similar manner, the first parts 111c and 111f and the third parts 113c and 113f appear on their sections.

Note that the first parts 111a, 111b, 111c, 111d, 111e, and 111f of the exterior components 11a, 11b, 11c, 11d, 11e, and 11f of the wire harnesses 1a, 1b, 1c, 1d, 1e, and 1f according to the respective embodiments of the present invention have an identical physical structure. The second parts 112a, 112b, 112d, and 112e of the exterior components 11a, 11b, 11d, and 11e of the wire harnesses 1a, 1b, 1d, and 1e according to the first embodiment, the second embodiment, the fourth embodiment, and the fifth embodiment of the present invention have an identical physical structure. The third parts 113a, 113c, 113d, and 113f of the exterior components 11a, 11c, 11d, and 11f of the wire harnesses 1a, 1c, 1d, and 1f according to the first embodiment, the third embodiment, the fourth embodiment, and the sixth embodiment of the present invention have an identical physical structure.

The exterior components 11a, 11b, 11c, 11d, 11e, and 11f are formed from a non-woven fabric made of a thermoplastic material. And, the first parts 111a, 111b, 111c, 111d, 111e, and 111f, the second parts 112a, 112b, 112d, and 112e, and the third parts 113a, 113c, 113d, and 113f are not formed from separate non-woven fabrics having different hardnesses (or different types of non-woven fabrics) but are formed from a single non-woven fabric (or one type of woven fabric). That is, "the part having the certain hardness" and the "part softer than the part having the certain hardness" are formed integrally from an identical material.

As this non-woven fabric, one having a base fiber and a binder fiber is applied. The base fiber is formed from a thermoplastic resin material having a certain melting point. The binder fiber has a core fiber and a binder component layer formed on the circumference of the core fiber. And, the core fiber is formed from a thermoplastic resin material identical to that of the base fiber. The binder component layer is formed from a thermoplastic resin material whose melting point is lower than the melting points of the base fiber and the core fiber.

Furthermore, the non-woven fabric before formed into an exterior component can be elastically deformed. In particular, the one compressively deformable so that an apparent volume is decreased is applied. And, preferably, the orientations of axial lines of the base fiber and the binder fiber contained in the non-woven fabric are random (=have no regularity).

When the base fiber and the binder fiber of the non-woven fabric as structured above are heated to a temperature equal to or higher than a certain temperature, they are in a plastically deformable state due to thermo plasticity. In particular, when they are heated to a temperature equal to or higher than the melting point of the binder component of the binder fiber and lower than the melting points of the base fiber and the core fiber of the binder fiber, the base fiber and the core fiber of the binder fiber become in a plastically deformable state due to thermo plasticity while a solid state (=a fiber state) is being kept, but the binder component of the binder fiber is molten to become a fluidizable state. In this state, the non-woven fabric is kept in a solid state as a whole, and becomes in a plastically deformable state due to thermo plasticity of the base fiber and the core fiber of the binder fiber.

For convenience of description, a temperature band between the melting point of the binder component of the binder fiber and the melting points of the base fiber and the core fiber of the binder fiber (however, not including the melting points of the base fiber and the core fiber of the binder fiber) is referred to as a "first temperature band".

When the non-woven fabric as described above is heated to a temperature in the first temperature band, the binder component of the binder fiber is molten to flow between the base fiber and the core fiber of the binder fiber. Then, when the non-woven fabric is cooled to a temperature lower than those in the first temperature band, the molten binder component is solidified. Then, the base fiber and the core fiber of the binder fiber are bound together by the solidified binder component.

That is, like an adhesive or a hot-melt resin, the solidified binder component binds the base fiber and the core fiber of the binder fiber together.

Therefore, the non-woven fabric as structured above is formed in a certain shape as being heated to a temperature in the first temperature band and, thereafter, when the non-woven fabric is cooled to a temperature lower than those in the first temperature band, the formed shape is kept. Furthermore, since the molten binder component is solidified to bind the base fiber and the core fiber of the binder fiber together, the non-woven fabric becomes hardened compared with the state before the non-woven fabric is heated to a temperature in the first temperature band.

As the base fiber and the core fiber of the binder fiber of the non-woven fabric as structured above, a fiber formed from PET (polyethylene terephthalate) can be applied. Also, as the binder component of the binder fiber, a copolymer resin of PET and PEI (polyethylene isophthalate) can be applied. And, to the binder fiber, a structure can be applied in which the binder component layer made of a copolymer resin of PET and PEI is formed on the circumferential surface of the base fiber made of PET. The melting points of the base fiber and the core fiber (=PET) of the binder fiber of the non-woven fabric as structured above are approximately 250 degrees Celsius. Also, the melting point of the binder component (=the melting point of the copolymer resin of PET and PEI) is approximately 110 degrees Celsius to 150 degrees Celsius. Therefore, the first temperature band of the non-woven fabric to which these materials are applied is 110 degrees Celsius to 250 degrees Celsius.

Note that the materials of the base fiber and the binder fiber are not restricted to the materials described above. In essence, the base fiber and the core fiber of the binder fiber and the binder component layer of the binder fiber can be made of a thermoplastic material, and the melting points of the base fiber and the core fiber of the binder fiber can be higher than the melting point of the binder component of the binder fiber. Therefore, not only PET and the copolymer resin of PET and PEI but also various thermoplastic materials can be applied.

In the structure in which this non-woven fabric is applied to the exterior components 11a, 11b, 11c, 11d, 11e, and 11f, the first parts 111a, 111b, 111c, 111d, 111e, and 111f, the second parts 112a, 112b, 112d, and 112e, and the third parts 113a, 113c, 113d, and 113f of the exterior components 11a, 11b, 11c, 11d, 11e, and 11f have the following structures as below.

The first parts 111a, 111b, 111c, 111d, 111e, and 111f are parts having densities of the base fiber and the binder fiber higher than that of the non-woven fabric in a state before being formed in the exterior components 11a, 11b, 11c, 11d, 11e, and 11f and having the base fiber and the core fiber of the binder fiber bound together by the binder component. For this reason, the first parts 111a, 111b, 111c, 111d, 111e, and 111f each have a hardness harder than that of the non-woven fabric in a state before being formed in the exterior component (in other words, the first parts each have a high stiffness and are less prone to be deformed).

Furthermore, the first parts 111a, 111b, 111c, 111d, 111e, and 111f have axial lines of the base fiber and the core fiber of the binder fiber oriented as a whole in a direction parallel to a surface (a circumferential surface) of the exterior components 11a, 11b, 11c, 11d, 11e, and 11f. At least, compared with other parts, the first parts 111a, 111b, 111c, 111d, 111e, and 111f have a high percentage of the base fiber and the core fiber of the binder fiber oriented in a direction parallel to the surfaces of the exterior components 11a, 11b, 11c, 11d, 11e, and 11f, respectively.

The second parts 112a, 112b, 112d, and 112e are parts having physical properties of the non-woven fabric before being formed in the exterior components 11a, 11b, 11d, and 11e. That is, they are parts where the non-woven fabric is simply compressed and deformed. Also, the binder component of the binder fiber is not molten and solidified. For this reason, the state is not such that "the base fiber and the core fiber of the binder fiber are bound together by the binder component". And, if the directions of the axial lines of the base fiber and the core fiber of the binder fiber are random before the fibers are formed in the exterior components 11a, 11b, 11d, and 11e, the directions are kept in a random state even after the fibers are formed in the exterior components 11a, 11b, 11d, and 11e.

The third parts 113a, 113c, 113d, and 113f are parts in which the base fiber and the core fiber of the binder fiber are bound together by the binder component. Note that the axial line directions of the base fiber and the binder fiber are identical to those of the second parts 112a, 112b, 112d, and 112e and, unlike the first parts 111a, 111b, 111c, 111d, and 111f, the axial line directions are not "oriented to a direction parallel to the surface of the exterior component as a whole". Also, compressive deformation is at a degree equal to or higher than those of the second parts 112a, 112b, 112d, and 112e and smaller than those of the first parts 111a, 111b, 111c, 111d, 111e, and 111f. As such, in each of the third parts 113a, 113c, 113d, and 113f, since the axial lines of the base fiber and the core fiber of the binder fiber are coupled together by the binder component, the third part is harder than it is before being formed in a relevant one of the exterior components 11a, 11c, 11d, and 11f and is harder than those of the second parts 112a, 112b, 112d, and 112e after being formed in a relevant one of the exterior components 11a, 11b, 11d, and 11e. On the other hand, the densities of the base fiber and the core fiber of the binder fiber are smaller than those of the first parts 111a, 111b, 111c, 111d, 111e, and 111f. And, the directions of the axial lines of the base fiber and the core fiber of the binder fiber are not aligned with a direction parallel to the surface of a relevant one of the exterior components 11a, 11c, 11d and 11f. For this reason, the third parts 113a, 113c, 113d, and 113f are softer than the first parts 111a, 111b, 111c, 111d, 111e, and 111f. Therefore, the third parts 113a, 113c, 113d, and 113f are softer than the first parts 111a, 111b, 111c, 111d, 111e, and 111f and harder than the second parts 112a, 112b, 112d, and 112e.

Therefore, in the exterior components 11a and 11d of the wire harnesses 1a and 1d according to the first embodiment and the fourth embodiment of the present invention, the first part 111a and 111d are the hardest, the second parts 112a and 112d are the softest, and the third parts 113a and 111d have an intermediate hardness between those of the first parts 111a and 111d and the second parts 112a and 112d. In the exterior components 11b and 11e of the wire harnesses 1b and 1e according to the second embodiment and the fifth embodiment of the present invention, the first parts 111b and 111e are hard, and the second parts 112b and 112e are soft. In the exterior components 11c and 11f of the wire harnesses 1c and 1f according to the third embodiment and the sixth embodiment of the present invention, the first part 111c and 111f are hard, and the third parts 113c and 113f are soft. As such, in the exterior components 11a, 11b, 11c, 11d, 11e, and 11f of the wire harnesses 1a, 1b, 1c, 1d, 1e, and 1f according to the respective embodiments of the present invention, parts having different hardnesses are formed.

A structure can be applied in which the dimensions, shape, position, and range of each of the first parts 111a, 111b, 111c, 111d, 111e, and 111f, the second parts 112a, 112b, 112d, and 112e, and the third parts 113a, 113c, 113d, and 113f are varied according to the functions of the exterior components 11a, 11b, 11c, 11d, 11e, and 11f and other factors.

For example, when the first parts 111a, 111b, 111c, 111d, 111e, and 111f each have a function of a protector and all directions of the circumference of each of the exterior components 11a, 11b, 11c, 11d, 11e, and 11f are desired to be protected, like the wire harnesses 1a, 1b, and 1c according to the first to third embodiments of the present invention, a structure can be applied in which the first parts 111a, 111b, and 111c are each formed across an entire circumference of a relevant one of the exterior components 11a, 11b, and 11c. By contrast, when only a certain part is desired to be protected, like the wire harnesses 1d, 1e, and 1f according to the fourth to sixth embodiments of the present invention, a structure can be applied in which the first parts 111d, 111e, and 111f are each formed only in the part desired to be protected and a part nearby (that is, a structure in which the first part is formed in part of the circumference).

Also, when the first parts 111a, 111b, 111c, 111d, 111e, and 111f each have a function of a shape keeping member, the position and shape of each of the first parts 111a, 111b, 111c, 111d, 111e, and 111f are varied according to the stiffness required for a relevant one of the exterior components 11a, 11b, 11c, 11d, 11e, and 11f, For example, to prevent the exterior components 11a, 11b, and 11c from being deformed in any direction, like the wire harnesses 1a, 1b, and 1c of the first to third embodiments of the present invention, a structure can be applied in which each of the first parts 111a, 111b, and 111c is formed across an entire circumference of a relevant one of the exterior components 11a, 11b, and 11c. By contrast, to allow the exterior component to be deformed in a certain direction but not to allow it to be deformed in another direction, like the wire harnesses 1d, 1e, and 1f according to the fourth to sixth embodiments of the present invention, a structure can be applied in which the first parts 111d, 111e, and 111f are each formed in an approximately flat shape on part of the surface. When the first parts 111d, 111e, and 111f are each formed in an approximately flat shape, curved deformation is allowed in the direction of the normal to the flat plate, but deformation cannot be made in a surface direction.

Furthermore, by changing the dimensions of the second parts 112a, 112b, 112d, and 112e and the third parts 113a, 113c, 113d, and 113f, the degrees of a function of a certain part of the wire 12 or the bundle of wires 12 as a cushioning material, a function thereof as a muffler/soundproofing material, and a function thereof as a heat insulating material can be changed.

Next, methods of manufacturing the wire harnesses 1a, 1b, 1c, 1d, 1e, and 1f (in other words, a method of forming the exterior components 11a, 11b, 11c, 11d, 11e, and 11f) according to the respective embodiments of the present invention are described. Note herein that a method of manufacturing the wire harness 1a according to the first embodiment of the present invention is mainly described and, as for the methods of manufacturing the wire harnesses 1b, 1c, 1d, 1e, and 1f according to the second to sixth embodiments of the present invention, only a structure different from that of the method of manufacturing the wire harness 1a according to the first embodiment of the present invention is described.

Figure 3:
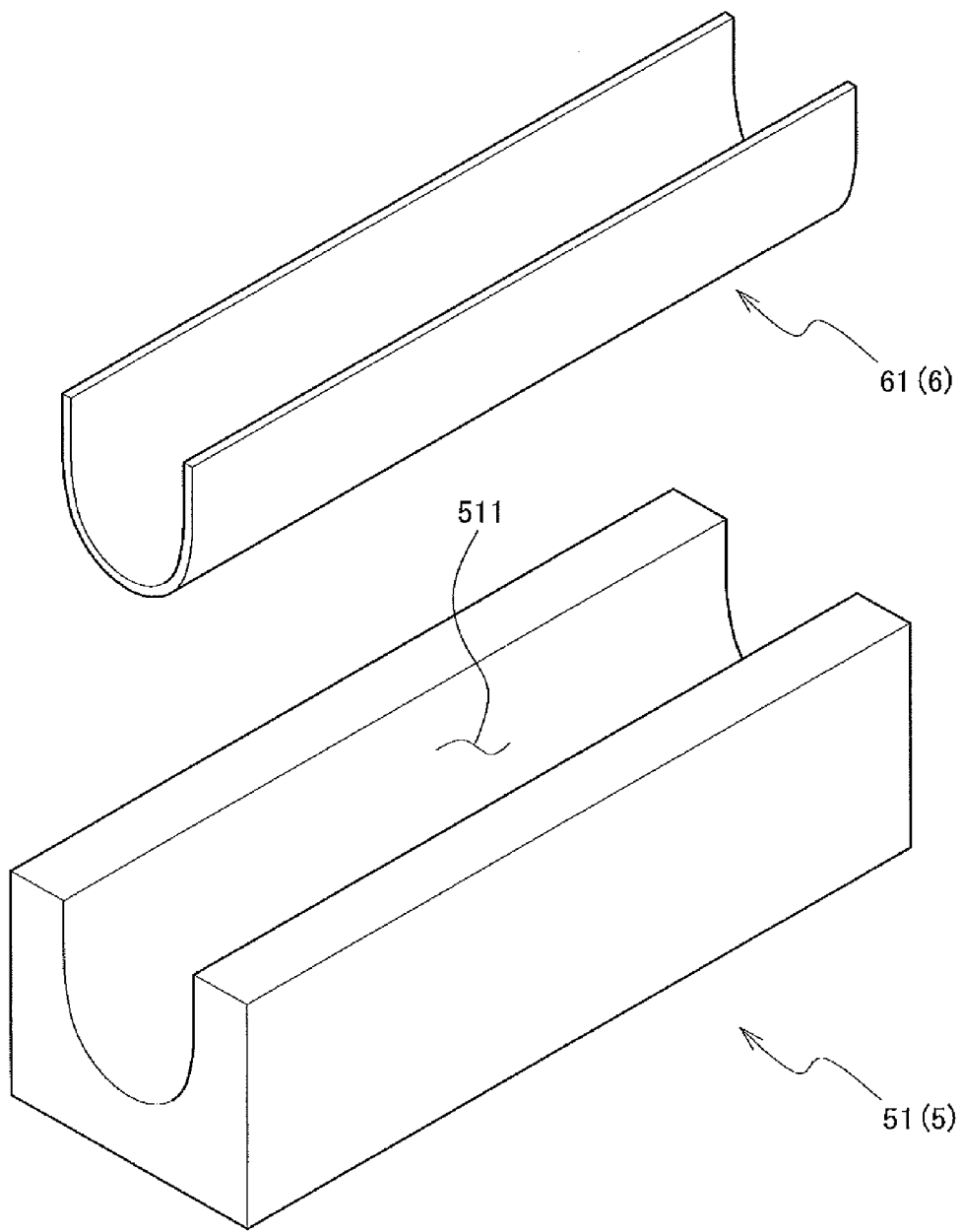
FIG. 3 is an external perspective view schematically showing a structure of a first molding tool and a first jig for use in a method of manufacturing the wire harness according to the present invention.
Figure 4:
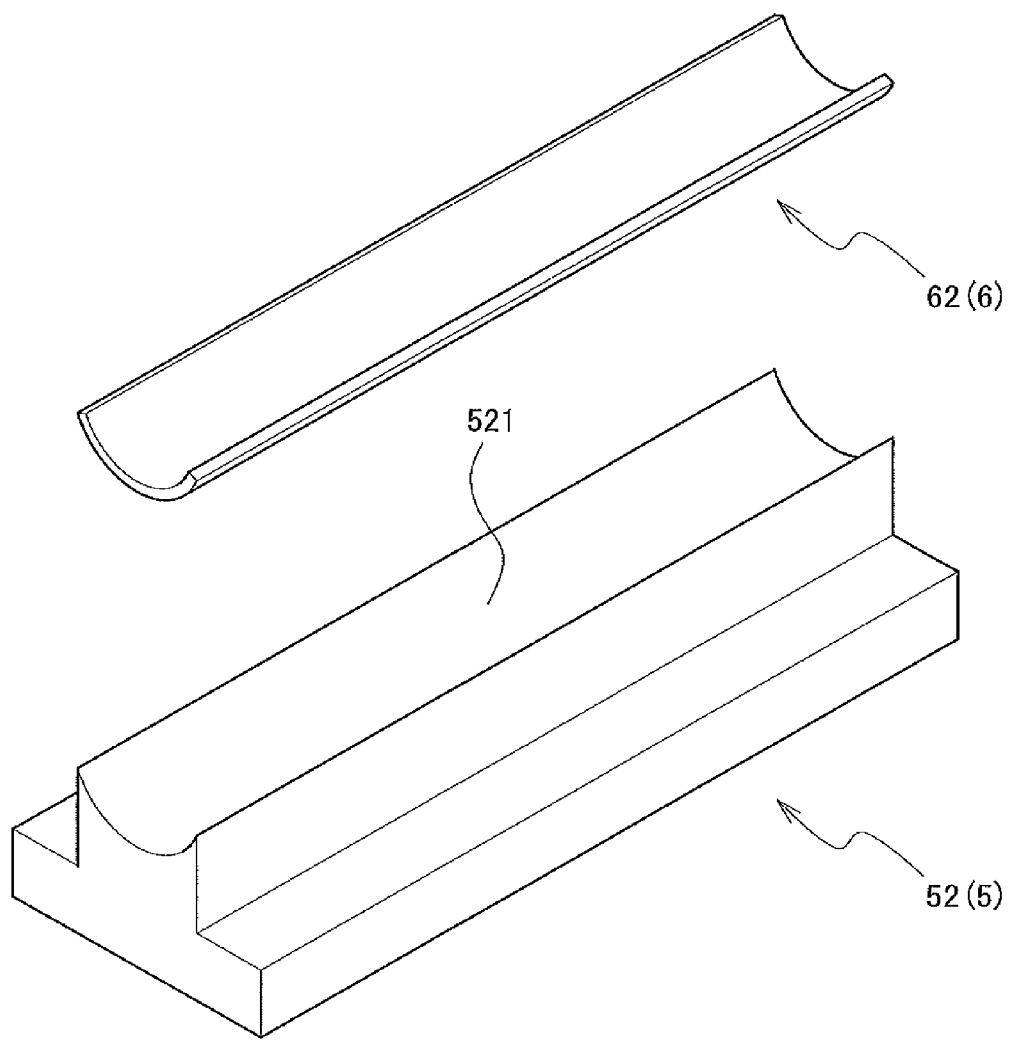
FIG. 4 is an external perspective view schematically showing a structure of a second molding tool and a second jig for use in the method of manufacturing this wire harness.

In the method of manufacturing the wire harness 1a according to the first embodiment of the present invention, a molding tool 5 and a jig (an auxiliary tool) 6 are used. The molding tool 5 has a first molding tool 51 and a second molding tool 52 forming a pair. The jig 6 also has a first jig 61 and a second jig 62 forming a pair. FIG. 3 and FIG. 4 are external perspective views each schematically showing a structure of the molding tool 5 and the jig 6 for use in the method of manufacturing the wire harness 1a according to the first embodiment of the present invention. Specifically, FIG. 3 shows a structure of the first molding tool 51 and the first jig 61, and FIG. 4 shows a structure of the second molding tool 52 and the second jig 62. And, an upper portion in FIG. 3 is a side of the first molding tool 51 and the first jig 61 facing the second molding tool 52 and the second jig 62. Also, an upper portion in FIG. 4 is a side of the second molding tool 52 and the second jig facing the first molding tool 51 and the first jig 61.

The molding tool 5 is a tool that heats and pressurizes the non-woven fabric 2 to form an exterior component having a certain shape and certain dimensions. On each of thee first molding tool 51 and the second molding tool 52 of the molding tool 5, as shown in FIG. 3 and FIG. 4, pressurizing parts 511 and 521 are formed, respectively. The pressurizing parts 511 and 521 are parts each heating and pressurizing the non-woven fabric 2 via the jig 6, which will be described further below. As shown in FIG. 3 and FIG. 4, the pressurizing part 511 formed on one molding tool 5 (here, the first molding tool 51) has a groove structure capable of letting the first jig 61 fit in. The pressurizing part 521 formed on the other molding tool 5 (here, the second molding tool 52) has a convex structure capable of fitting in the first jig 61.

Furthermore, the molding tool 5 has heating means (not shown) capable of heating the pressurizing parts 511 and 521 to a "certain temperature". Note that the "certain temperature" will be described further below. As the heating means, various known heating means can be applied. For example, an electrically heated wire is applied as the heating means, and a structure in which this electrically heated wire is buried inside the molding tool 5 or a structure in which the electrically heated wire is mounted on the circumference of the molding tool 5 can be applied. Also, a structure can be applied in which, for example, a path (for example, a hole) allowing a fluid to pass through is formed inside the molding tool 5 and the temperature-adjusted fluid (gas (such as air or superheated steam) or liquid (such as oil)) is let pass through this path. As such, the heating means can have a structure capable of heating the pressurizing parts 511 and 521 of the molding tool to the "certain temperature", and its type and structure are not restricted.

The jig 6 is a tool used when the non-woven fabric 2 is heated and pressurized to form the exterior component 11a to improve operability and improve work efficiency. As shown in FIG. 3 and FIG. 4, the first jig 61 has a structure capable of accommodating a certain part of the wire 12 or the bundle of wires 12 and the non-woven fabric 2 mounted on that part. The second jig 62 is a tool having an approximately stick-shaped structure having a certain sectional shape, and has a structure capable of fitting in the first jig 61. And, the jig has a structure in which when the second jig 62 fits in the first jig 61, the dimensions and shape of a space surrounded by the first jig 61 and the second jig 62 become identical the dimensions and shape of the exterior component 11a to be formed. For example, when the exterior component 11a to be formed has a section in a direction at a right angle to the axial line direction being in an approximately circular shape and has an axial line shape being in an approximately straight line, a stick-shaped structure having a section being in an approximately "U" shape is applied to the first jig 61, and a stick-shaped structure having a section being in an approximately semicircular shape is applied to the second jig 62.

As such, the dimensions and shape of the jig 6 are set based on the dimensions and shape of the exterior component 11a to be formed, and are not particularly restricted. Note that the jig 6 preferably has a structure in which heat tends to be transmitted easily between outside (=a side in contact with the pressurizing parts 511 and 521 of the molding tool 5) and inside (=a side in which the non-woven fabric 2 is accommodated). Furthermore, the jig 6 preferably has a structure with a small thermal storage amount (=a structure easily following ambient temperature). For this reason, for example, a structure can be applied in which the jig 6 is made of a thin metal plate or the like and is manufactured by sheet-metal processing.

Figure 5A:
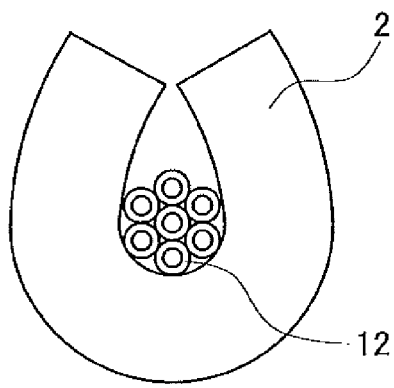
FIG. 5 shows views schematically showing a process of mounting a non-woven fabric on a certain part of a wire or a bundle of wires in the method of manufacturing this wire harness, FIG. 5(a) showing a structure in which the non-woven fabric in a plate shape (or a block shape) is bent to be mounted so as to interpose, FIG. 5(b) showing a structure in which a non-woven fabric in a sheet shape is mounted so as to be coiled, FIG. 5(c) showing a structure in which a non-woven fabric in a rod shape formed with a slit is applied and, with a certain part of a wire or a bundle of wires buried inside the slit, the non-woven fabric is mounted on the circumference of the certain part of the wire or the bundle of wires, and FIG. 5(d) showing a structure in which a certain part of a wire or a bundle of wires is interposed between two non-woven fabrics for mounting.
Figure 5B:
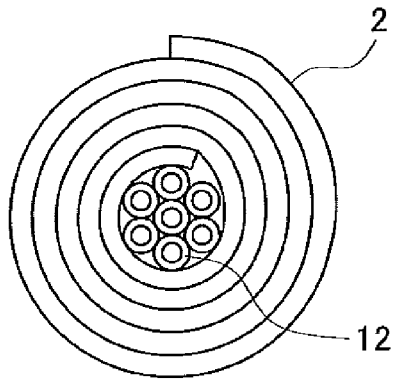
Figure 5C:
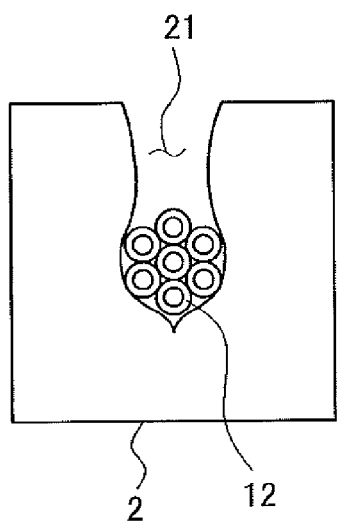
Figure 5D:
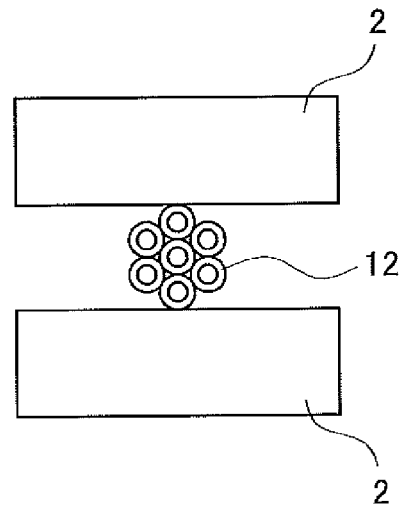
Figure 6:
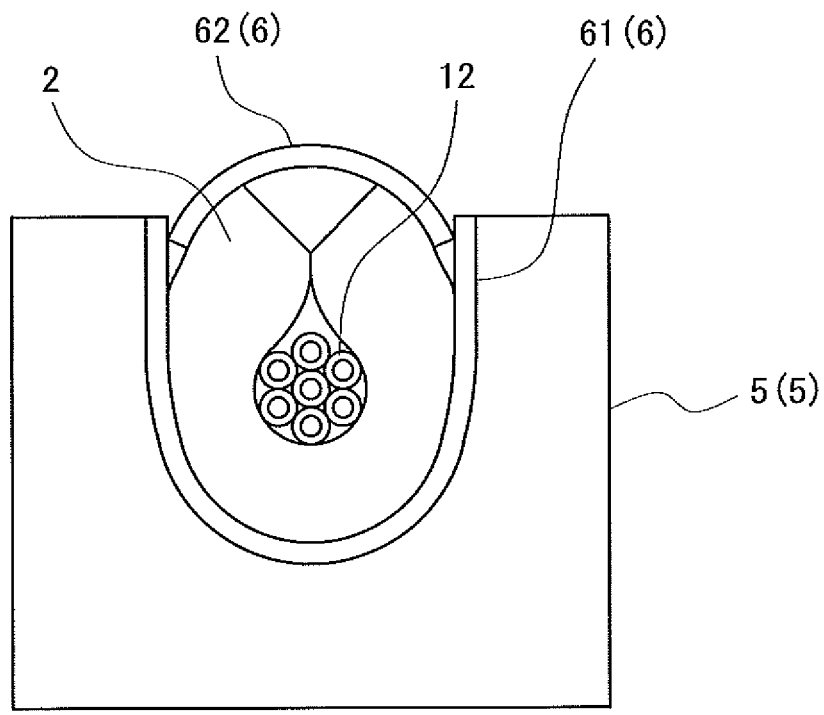
FIG. 6 is a view schematically showing a process of accommodating a wire or a bundle of wires and a non-woven fabric in a jig and fitting the jig in a molding tool in the method of manufacturing this wire harness.
Figure 7:
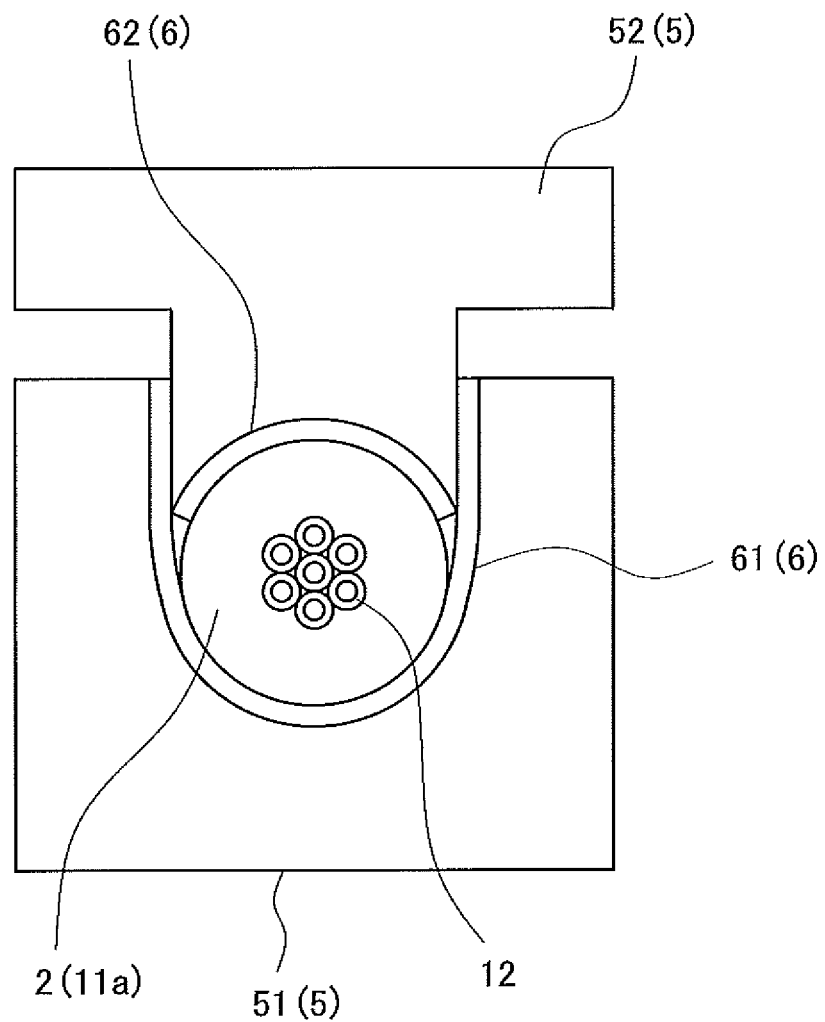
FIG. 7 is a view schematically showing a process of heating and pressurizing the non-woven fabric by a molding tool in the method of manufacturing this wire harness.
Figure 8:
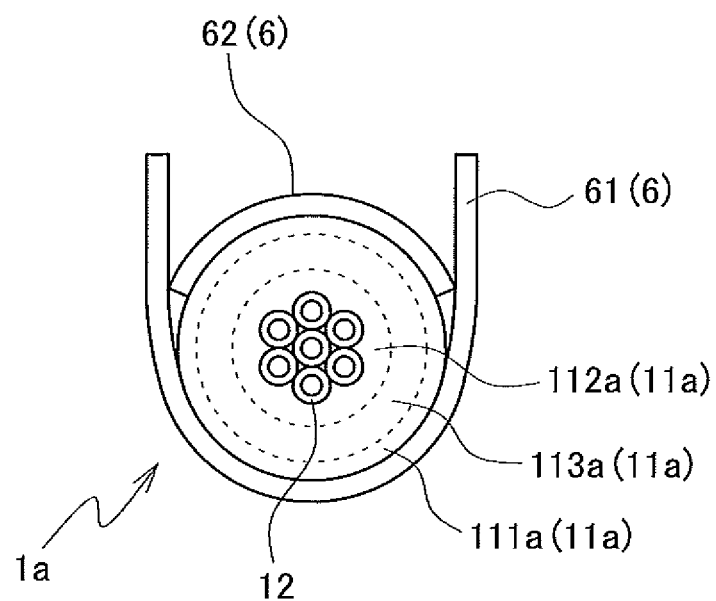
FIG. 8 is a view showing a process of removing a formed exterior component from the molding tool as being accommodated in the jig in the method of manufacturing this wire harness.

FIG. 5 to FIG. 8 are sectional views schematically showing a certain process included in the method of manufacturing the wire harness 1a according to the first embodiment of the present invention, which are specifically as follows. FIG. 5 shows views schematically showing a process of mounting the non-woven fabric 2 on a certain part of the wire 12 or the bundle of wires 12. FIG. 6 is a view schematically showing a process of accommodating the non-woven fabric 2 in a certain part of the wire or the bundle of wires 12, and fitting the jig 6 in the molding tool 5. FIG. 7 is a view schematically showing a process of heating and pressurizing the non-woven fabric 2 by the molding tool 5. FIG. 8 is a view showing a process of removing the formed exterior component 11a from the molding tool 5 as being accommodated in the jig 6.

First, as shown in FIG. 5, the non-woven fabric 2 is mounted on the circumference of a certain part of the wire 12 or the bundle of wires 12. The shape and dimensions of the non-woven fabric 2 are not particularly restricted. For example, the non-woven fabric 2 in a plate shape (or a block shape), the non-woven fabric 2 in a sheet shape, the non-woven fabric in a stick shape having a certain sectional shape with a slit 21 formed from the circumference toward a center part, and others can be applied.

As shown in FIG. 5(a), when the non-woven fabric 2 in a plate shape (or a block shape) is applied, a structure is applied in which the non-woven fabric 2 is bent to interpose a certain part of the wire 12 or the bundle of wires 12, thereby mounting the non-woven fabric 2 on the circumference of the certain part of the wire 12 or the bundle of wires 12. As shown in FIG. 5(b), when the non-woven fabric 2 in a sheet shape is applied, a structure is applied in which the non-woven fabric is mounted so as to be coiled around the circumference of the certain part of the wire 12 or the bundle of wires 12. In this case, a structure is applied in which the non-woven fabric 2 is coiled a plurality of times. As shown in FIG. 5(c), when the non-woven fabric 2 in a stick shape with the slit 21 formed therein is applied, a structure is applied in which the certain part of the wire 12 or the bundle of wires 12 is buried inside the slit 21, thereby mounting the non-woven fabric 2 on the circumference of the certain part of the wire 12 or the bundle of wires 12. Note that while the structure is shown in FIG. 5(a) to FIG. 5(c) such that one non-woven fabric 2 is mounted on the circumference of the certain part of the wire 12 or the bundle of wires 12, a structure may be such that a plurality of non-woven fabrics 2 are mounted. For example, as shown in FIG. 5(d), two non-woven fabrics are applied, and a structure is applied in which the non-woven fabrics 2 are mounted on the circumference of the certain part of the wire 12 or the bundle of wires 12 with these two non-woven fabrics 2 interposing the certain part of the wire 12 or the bundle of wires 12.

In the case of the form shown in FIG. 5(a), all it takes is to interpose the certain part of the wire 12 or the bundle of wires 12 by bending the non-woven fabric 2. Thus, the details of operation of this process are simple, and time reduction can be achieved. In the case of the form as shown in FIG. 5(b), the certain part of the wire 12 or the bundle of wires 12 can be positioned at an approximately center of the non-woven fabric 2. That is, the certain part of the wire 12 or the bundle of wires 12 can be reliably positioned at the center of the formed exterior component 11a, and a deviation of the position inside the interior component 11a can be prevented. In the case of the form as shown in FIG. 5(c), all it takes is to push the certain part of the wire 12 or the bundle of wires 12 into the slit 21 of the non-woven fabric 2. Thus, the operation is simple. Also, a deviation of the certain part of the wire 12 or the bundle of wires 12 inside the formed exterior component 11a can be prevented. In the case of the form as shown in FIG. 5(d), all it takes is to interpose the certain part of the wire 12 or the bundle of wires 12 with two non-woven fabrics 2. Thus, the details of operation of this process are simple, and time reduction can be achieved.

Note that in the state in which the non-woven fabric 2 is mounted on the circumference of the certain part of the wire 12 or the bundle of wires 12, the shape and dimensions of the section (here, the section cut in a direction at a right angle to the axial line direction of the certain part of the wire or the bundle of wires 12) of the non-woven fabric 2 are larger than the section of the formed exterior component 11a. In other words, the outline of the outer shape of the section of the non-woven fabric 2 in the state in which the non-woven fabric 2 is mounted on the circumference of the certain part of the wire 12 or the bundle of wires 12 is outside of the outline of the outer shape of the section of the exterior component 11a (=the non-woven fabric 2 after being formed).

Next, as shown in FIG. 6, the certain part of the wire 12 or the bundle of wires 12 and the non-woven fabric 2 mounted on this part are accommodated in the jig 61. Specifically, the non-woven fabric 2 and others are accommodated inside the first jig 61, and the second jig 62 further fits therein. Then, the non-woven fabric 2 is kept in a state of being mounted on the circumference of the certain part of the wire 12 or the bundle of wires 12. For this reason, the certain part of the wire 12 or the bundle of wires 12 can be prevented from coming off from the non-woven fabric 2, and the non-woven fabric 2 can be prevented from returning to the shape before being mounted on the circumference of the certain part of the wire 12 or the bundle of wires 12. And, the jig 6 in which the certain part of the wire 12 or the bundle of wires 12 and the non-woven fabric 2 are accommodated fits in the pressurizing part 511 of the first molding tool 51.

Next, as shown in FIG. 7, the first molding tool 51 and the second molding tool 52 of the molding tool 5 are brought close to each other. Then, the dimensions and shape of a region formed inside the jig are set to be identical to the shape and dimensions of the formed exterior component 11a. With this, the non-woven fabric 2 is pressurized by the molding tool via the jig 6 to be compressively deformed to the dimensions and shape of the exterior component 11a. Then, with heat generated from the heating means of the molding tool 5, the non-woven fabric is heated in the state of being compressively deformed.

Then, this state is kept over a "certain time". That is, heating and pressurizing the non-woven fabric 2 continues over the "certain time".

The "certain temperature" is a temperature at which the non-woven fabric 2 can be heated to a temperature in the "first temperature band". For example, as the "certain temperature", a temperature equal to or higher than a temperature in the "first temperature band" is applied.

Also, the "certain time" is as follows. The time is when a part in contact with the jig 6 and a part nearby (that is, a part as a surface layer part of the exterior component 11a) of the non-woven fabric 2 reach a temperature in the first temperature band but a part in contact with the certain part of the wire 12 or the bundle of wires 12 and a part nearby (that is, a part as a center part of the exterior component 11a) do not reach a temperature in the first temperature band.

Next, as shown in FIG. 8, after a lapse of the "certain time", the molding tool 5 is separated. Then, the formed exterior component 11a and the certain part of the wire 12 or the bundle of wires 12 (that is, the certain part of the wire harness 1a according to the first embodiment of the present invention) is removed from the molding tool 5 as being accommodated in the jig 6 (=as being interposed between the first jig 61 and the second jig 62).

Thereafter, the exterior component 11a and the certain part of the wire 12 or the bundle of wires 12 are cooled as being accommodated in the jig 6. Note that a cooling method is not particularly restricted. For example, a method of storing them in a refrigerator, a method of spraying gas at room temperatures or a low temperature, a method of leaving them at room temperatures, or the like can be applied.

Note that the jig 6 is formed from a material with a high thermal conductivity, and has a structure of easily transmitting heat between inside and outside. For this reason, heat in the formed exterior component 11a is quickly dissipated outside through the jig 6. Also, in a structure in which the jig 6 is made of a metal plate or the like and is formed by sheet-metal processing or the like (that is, is structured to have a small mass), the thermal storage amount is small. Thus, when the jig is removed from the molding tool 5, a temperature drop starts immediately. For this reason, the formed exterior component 11a is not heated by the jig 6 after being removed from the molding tool 5. According to the structure described above, the formed exterior component 11a can be prevented from being heated more than required. Therefore, the properties of the exterior component can be easily controlled.

According to the manufacturing method described above, the exterior component 11a having the first part 111a, the second part 112a, and the third part 113a is formed with the following mechanism.

When the first molding tool 51 and the second molding tool 52 are brought in contact with each other, the non-woven fabric 2 is heated and pressurized by the molding tool 5 via the jig 6. For this reason, the non-woven fabric 2 is compressively deformed to have the dimensions and shape of the exterior component 11a to be formed.

Then, a part of the non-woven fabric 2 with a certain depth from a surface in contact with the jig 6 reaches a temperature in the first temperature band. The part reaching the temperature in the first temperature band is in a state of being easily plastically deformed due to thermo plasticity, and therefore the part is plastically deformed (here, compressively deformed) by heating and pressurizing due to thermo plasticity. Note that since the non-woven fabric 2 has a high temperature on a surface side (=a side in contact with the jig 2) compared with a center side (=a side in contact with the circumference of the certain part of the wire 12 or the bundle of wires 12), the degree of plastic deformation due to thermo plasticity in the part reaching the temperature in the first temperature band is larger from the center side toward the surface side. Therefore, the densities of the base fiber and the binder fiber at this part of the non-woven fabric are high on the surface side.

And, particularly on the surface layer part of the non-woven fabric 2, the axial lines of the base fiber and the binder fiber of the non-woven fabric 2 are oriented, by heating and pressurizing, to a direction at a right angle with respect to a compressing direction as a whole (that is, a direction parallel to the surface of the exterior component 11a). The part where the axial lines of the base fiber and the binder fiber of the non-woven fabric 2 are oriented to the direction parallel to the surface of the exterior component 11a particularly has a high density of the base fiber and the core fiber of the binder fiber, compared with other parts.

Furthermore, in the part of the non-woven fabric 2 reaching the temperature in the first temperature band, the binder component of the binder fiber is molten, and the molten binder component flows out between the base fiber and the core fiber of the binder fiber. Thereafter, when the non-woven fabric 2 is cooled to a temperature lower than those in the first temperature band, the molten and flowing binder component is solidified to bind the base fiber and the core fiber of the binder fiber together.

With this, on the surface layer part of the non-woven fabric 2, the densities of the base fiber and the core fiber are higher than those before pressurizing, and the axial lines of the base fiber and the core fiber of the binder fiber are coupled together by the binder component as being oriented to a direction parallel to the surface. For this reason, the surface layer part becomes hardened compared with the non-woven fabric before heating and pressurizing. Also, since the axial line directions of the base fiber and the core fiber of the binder fiber are oriented to the direction parallel to the surface, wear resistance is increased compared with the state in which the axial lines of the base fiber and the binder fiber are oriented to random directions.

As such, on the surface layer part of the exterior component 11a, a hard part having a high wear resistance compared with other parts is formed. This part becomes the "first part 111a". The first part 111a is a part having densities of the base fiber and the core fiber of the binder fiber higher than those of other parts (and higher than that of the non-woven fabric 2 before pressurizing and heating), also having the axial lines of the base fiber and the core fiber of the binder fiber oriented to the direction parallel to the surface as a whole (at least having a high ratio of the base fiber and the core fiber of the binder fiber with their axial lines oriented to the direction parallel to the surface), and having the base fiber and the core fiber of the binder fiber bound together by the binder component.

On the other hand, the part of the non-woven fabric 2 in contact with the circumference of the certain part of the wire 12 or the bundle of wires 12 and the part nearby do not reach a temperature in the first temperature band. For this reason, in these parts, the binder component of the binder fiber is not molten. Therefore, these parts have physical properties of the non-woven fabric before heating and pressurizing (for example, easy deformability). As such, a soft part compared with the first part is formed in the part in contact with the circumference of the certain part of the wire or the bundle of wires and the part nearby. This part becomes the "second part 112a". In other words, the second part 112a is a part where the binder component is not molten and having the properties of the non-woven fabric before pressurizing and heating.

Furthermore, in the part of the non-woven fabric 2 reaching the temperature in the first temperature band, a part on a center side from the part becoming the first part 111a becomes the "third part 113a". In the third part 113a, as with the first part 111a, the base fiber and the core fiber of the binder fiber are bound together by the molten and solidified binder component. For this reason, the third part is harder than the second part 112a. However, the degree of plastic deformation (compressive deformation) is smaller than that of the first part 111a and the axial line orientation of the axial lines of the base fiber and the core fiber of the binder fiber is not significantly changed from the orientation before heating and pressurizing (that is, the structure is not such that the axial lines are oriented to random directions or "are oriented to the direction parallel to the surface of the exterior component 11a as a whole"). For this reason, the third part 113a is softer than the first part 111a.

As such, the third part 113a having an intermediate hardness between those of the first part 111a and the second part 112a is formed between the first part 111a and the second part 112a (in other words, to a center from the first part 111a).

Furthermore, with the following mechanism, the formed exterior component 11a is structured to cover the certain part of the wire 12 or the bundle of wires without a clearance. First, when the non-woven fabric 2 has a flat-shaped structure and is bent so as to cover the certain part of the wire 12 or the bundle of wires 12 or when the non-woven fabric 2 has a sheet-shaped structure and is coiled around the circumference of the certain part of the wire 12 or the bundle of wires 12, end faces in a width direction (=the direction at a right angle to the axial line direction of the wire 12 or the bundle of wires 12) of the non-woven fabric 2 in contact with each other are bound together by the binder component of the molten binder fabric. When the non-woven fabric 2 has a stick-shaped structure and the certain part of the wire 12 or the bundle of wires 12 is accommodated inside the slit 21, inner surfaces of the slit 21 are bound together by the binder component. When the certain part of the wire 12 or the bundle of wires 12 is covered with a plurality of non-woven fabrics 2, the binder component of the molten binder fabric binds contact surfaces of the plurality of non-woven fabrics 2. Therefore, the exterior component 11a has a structure of covering the surroundings of the certain part of the wire 12 or the bundle of wires 12 without a break. In particular, since surfaces of the non-woven fabrics 2 are bound together, a high binding force can be obtained.

According to this structure, an adhesive or the like is not required to bind the non-woven fabrics 2, and therefore cost reduction can be achieved. And, a process of "binding the non-woven fabrics 2 together by an adhesive" is not required, and therefore a reduction in the number of processes (prevention of an increase in the number of processes) can be achieved.

Note that the dimensions of the first part 111a (here, they refer to dimensions in a diameter method when the exterior component 11a is regarded as a cylindrical column; the same applies to the following) can be changed by adjusting either one or both of a heating time and a heating temperature in the process of heating and pressurizing the non-woven fabric 2. That is, when the heating time is extended or the heating temperature is increased, the dimensions of the first part 111a are increased. On the other hand, when the heating time is shortened or the heating temperature is lowered, the dimensions of the first part 111a are decreased.

Furthermore, the dimensions of the first part 111a can be changed by varying the dimensions of the non-woven fabric 2 to be mounted in the process of mounting the non-woven fabric 2 on the certain part of the wire 12 or the bundle of wires 12. That is, when the dimensions of the non-woven fabric 2 to be mounted are increased, the degree of compressive deformation of the non-woven fabric 2 is increased in the process of pressurizing the non-woven fabric 2 during heating. For this reason, the base fiber and the binder fiber of the non-woven fabric oriented to the direction parallel to the surface of the exterior component 11a are increased. With this, the dimensions of the first part 111a are increased. On the other hand, when the dimensions of the non-woven fabric 2 to be mounted are decreased, the degree of compressive deformation of the non-woven fabric 2 is lowered in the process of pressurizing the non-woven fabric 2 during heating. For this reason, the base fiber and the binder fiber of the non-woven fabric 2 oriented in the direction parallel to the surface of the exterior component 11a are decreased. With this, the dimensions of the first part 111a are decreased.

Still further, the dimensions of the second part 112a and the third part 113a of the wire harness 1a according to the first embodiment of the present invention can be changed by adjusting either one or both of the heating time and the heating temperature in the process of pressurizing the non-woven fabric 2 during heating. That is, when the heating time is extended or the heating temperature is increased, the dimensions of the part reaching the temperature in the first temperature band are increased. Therefore, the dimensions of the second part 112a are decreased, and the dimensions of the third part 113a are increased. On the other hand, when the heating time is shortened or the heating temperature is lowered, the part reaching the temperature in the first temperature band is decreased. Therefore, the dimensions of the second part 112a are increased, and the dimensions of the third part 113a are decreased.

Next, the method of manufacturing the wire harness 1b according to the second embodiment of the present invention is described. Note that compared with the method of manufacturing the wire harness 1a according to the first embodiment of the present invention, the "certain time" for pressurizing the non-woven fabric 2 during heating is short in the method of manufacturing the wire harness 1b according to the second embodiment of the present invention. When the "certain time" is shortened, in the non-woven fabric 2 mounted on the circumference of the certain part of the wire 12 or the bundle of wires 12, a part reaching a temperature in the first temperature band is decreased. That is, only the surface layer part of the non-woven fabric 2 reaches the temperature in the first temperature band. For this reason, only the part with the axial lines of the base fiber and the core fiber of the binder fiber being oriented to the direction parallel to the surface due to compressive deformation reaches the temperature in the first temperature band. With this, the "first part 111b" is formed on the surface layer part of the exterior component, the other parts become the "second part 112b", and no "third part" is formed. Note that as structures other than this, the structure identical to that of the method of manufacturing the wire harness 1a according to the first embodiment of the present invention is applied (refer to FIG. 2(b)). Therefore, description is omitted.

Next, the method of manufacturing the wire harness 1c according to the third embodiment of the present invention is described. Note that compared with the method of manufacturing the wire harness 1a according to the first embodiment of the present invention, the "certain time" for pressurizing the non-woven fabric 2 during heating is long in the method of manufacturing the wire harness 1c according to the third embodiment of the present invention. When the "certain time" is extended, the non-woven fabric 2 mounted on the circumference of the certain part of the wire 12 or the bundle of wires 12 reaches a temperature in the first temperature band in its entirety. For this reason, the part with the axial lines of the base fiber and the core fiber of the binder fiber being oriented to the direction parallel to the surface due to compressive deformation becomes the first part 111c, and the other parts all become the third part 113c. With this, the "first part 111c" is formed on the surface layer part of the exterior component 11c, the other parts become the "third part 113c", and no "second part" is formed (refer to FIG. 2(c)). Note that as structures other than this, the structure identical to that of the method of manufacturing the wire harness 1a according to the first embodiment of the present invention is applied. Therefore, description is omitted.

Next, the method of manufacturing the wire harness 1d according to the fourth embodiment of the present invention is described. In the method of manufacturing the wire harness 1d according to the fourth embodiment of the present invention, in the process of pressurizing the non-woven fabric 2 during heating, only parts where the first part 111d and the third part 113d are desired to be formed are heated. For example, as shown in FIG. 1(d), when the first part 111d and the third part 113d are formed on a half of the circumference of the exterior component 11d, for example, a structure can be applied in which only one molding tool 5 includes heating means to heat the half of the non-woven fabric 2. As such, the structure can be such that only parts where the first part 111d and the third part 113d are to be formed are heated. Therefore, for example, the structure may be such that the molding tool 5 can heat only a certain part of the pressurizing parts 511 and 521 (=a part in contact to a part where the first part 111d and the third part 113d are desired to be formed) by the heating means. Note that as structures other than this, the structure identical to that of the method of manufacturing the wire harness 1a according to the first embodiment of the present invention is applied. Therefore, description is omitted.

In the method of manufacturing the wire harness 1e according to the fifth embodiment of the present invention, a structure is applied in the method of manufacturing the wire harness 1d according to the fourth embodiment of the present invention in which the "certain time" of pressurizing the non-woven fabric 2 during heating is shortened. That is, the method has a relation identical to the method of manufacturing the wire harness 1b according to the second embodiment of the present invention with respect to the method of manufacturing the wire harness 1a according to the first embodiment of the present invention. Therefore, description is omitted.

In the method of manufacturing the wire harness 1f according to the sixth embodiment of the present invention, a structure is applied in which the heating temperatures are varied between a part where the first part 111f is to be formed and a part where the third part 113f is to be formed in the process of pressurizing the non-woven fabric 2 during heating. For example, a structure can be applied in which the part where the first part 111f is to be formed is heated at a temperature near an upper limit in the first temperature band (or a temperature higher than those in the first temperature band) and the part where the third part 113f is to be formed is heated at a temperature near a lower limit in the first temperature band. With this structure, the part heated at the temperature near the upper limit in the first temperature band has a large degree of plastic deformation due to thermo plasticity, and therefore becomes the first part 111f. On the other hand, the part heated at the temperature near the lower limit in the first temperature band has a temperature lower than that of the part heated at the temperature near the upper limit in the first temperature band and therefore has a low degree of plastic deformation due to thermo plasticity, thereby becoming the third part 113f.

Also, the structure may be such that the first part 111f and the third part 113f are formed at different timings. For example, the non-woven fabric 2 is heated at a temperature in the first temperature band to cause the entire non-woven fabric 2 to become the third part 113f. Subsequently as it is, the part where the first part 111f is desired to be formed is heated at a temperature near the upper limit in the first temperature band to form the first part 111f.

Even with this structure, the wire harness 1f according to the sixth embodiment of the present invention can be manufactured. Note that the order of forming the first part 111f and the third part 113f may be reversed. Also in this case, the molding tool that can change the temperatures of the pressurizing parts 511 and 521 can be used.

Note that in the method of manufacturing each of the wire harnesses 1a, 1b, 1c, 1d, 1e, and 1f according to the respective embodiments of the present invention, the structure may be such that the non-woven fabric 2 is directly heated and pressurized by the molding tool 5 without using the jig 6. In this case, the molding tool 5 can have a structure in which the pressurizing part 521 of the second molding tool fits in the pressurizing part 511 of the first molding tool 51 when the first molding tool 51 and the second molding tool 52 are brought close to each other and can have a structure in which the dimensions and shape of the space surrounded by the pressurizing parts 511 and 521 become identical to the dimensions and shape of the exterior component 11a to be formed. Note that in the structure in which the jig 6 is not used, the structure is preferably such that the molding tool 5 includes cooling means in addition to the heating means. According to this structure, after the non-woven fabric 2 is pressurized during heating over the "certain time", the mold is cooled by the cooling means, thereby cooling the formed exterior component 11a to a temperature at which plastic deformation due to thermo plasticity does not occur.

In the case of using the jig 6, an improvement in operability can be achieved. For example, a place where the non-woven fabric 2 is accommodated in the jig 6 and a place where the non-woven fabric 2 is pressurized by the molding tool 5 during heating are not required to be the same, and therefore the accommodating operation can be performed in a comfortable place to operate. Also, each of the formed exterior components 11a, 11b, 11c, 11d, 11e, and 11f can be cooled as being removed from the molding tool 5. For this reason, the molding tool 5 can be always kept at a certain temperature, and a reduction in time required for heating and cooling the molding tool 5 can be achieved.

On the other hand, in the case of not using the jig 6, the non-woven fabric 2 is directly heated by the molding tool 5, and therefore the temperature of the non-woven fabric 2 can be easily managed. In particular, in the method of manufacturing each of the wire harnesses 1d, 1e, and 1f according to the fourth to sixth embodiments of the present invention, the accuracy of a range where each of the first parts 111d, 111e, and 111f is formed can be increased.

The wire harnesses 1a, 1b, 1c, 1d, 1e, and 1f according to the respective embodiments of the present invention achieve the following operations and effects.

In each of the exterior components 11a, 11b, 11c, 11d, 11e, and 11f of the wire harnesses 1a, 1b, 1c, 1d, 1e, and 1f according to the respective embodiments of the present invention, a relevant one of the first parts 111a, 111b, 111c, 111d, 111e, and 111f, which are parts having a certain hardness, and a relevant one (ones) of the second parts 112a, 112b, 112d, and 112e and/or the third parts 113a, 113c, 113d, and 113f, which are part softer than the first parts 111a, 111b, 111c, 111d, 111e, and 111f, are formed integrally from the identical material (=the identical non-woven fabric 2). In other words, in each of the exterior components 11a, 11b, 11c, 11d, 11e, and 11f of the wire harnesses 1a, 1b, 1c, 1d, 1e, and 1f according to the respective embodiments of the present invention, a relevant one of the first parts 111a, 111b, 111c, 111d, 111e, and 111f, a relevant one of the second parts 112a, 112b, 112d, and 112e, and a relevant one of the third parts 113a, 113c, 113d, and 11f, the first, second, third parts having different hardnesses, are formed integrally from the identical material (=the identical non-woven fabric 2).

And, the first parts 111a, 111b, 111c, 111d, 111e, and 111f, which are hard parts, can be each provided with either one or a plurality of functions of (1) a function of a shape keeping member keeping a certain part of the wire 12 or the bundle of wires 12 in a certain shape and (2) a function of a protector protecting the wire 12 or the bundle of wires 12. On the other hand, the second parts 112a, 112b, 112d, and 112e and the third parts 113a, 113c, 113d, and 113f, which are soft parts, can be provided with (3) a function of a muffler material or a soundproofing material preventing or suppressing the occurrence of an unusual noise, (4) a function of a heat insulating material preventing or suppressing transmission of heat to the wire 12 or the bundle of wires 12, and (5) a function of a cushioning material preventing a shock from being given to the wire 12 or the bundle of wires 12. Furthermore, the exterior components 11a, 11b, 11c, 11d, 11e, and 11f can also be provided as a whole with a function of a binding material gathering the bundle of wires to prevent them from coming apart.

As such, with one type of material and the common process, the exterior components 11a, 11b, 11c, 11d, 11e, and 11f having any of the functions of a shape keeping member, a protector, a muffler material, a cushioning material, a soundproofing material/a muffler material, a heat insulating material, and a binding material can be formed. Furthermore, with one type of material and the common process, the exterior components 11a, 11b, 11c, 11d, 11e, and 11f having a plurality of functions among these functions can also be formed. For example, a shape keeping member or a protector having a cushioning function, a muffler/soundproofing function, and a heat insulating function can be formed from one type of material with the same process.

Therefore, according to the wire harnesses 1a, 1b, 1c, 1d, 1e, and 1f in accordance with the respective embodiments of the present invention, even when the exterior components 11a, 11b, 11c, 11d, 11e, and 11f are provided with different functions, the exterior components 11a, 11b, 11c, 11d, 11e, and 11f can be formed from the common material. With this, commonality of materials of the exterior components 11a, 11b, 11c, 11d, 11e, and 11f can be achieved, and therefore the number of types of material of the exterior components 11a, 11b, 11c, 11d, 11e, and 11f can be decreased and thus material inventory can be easily managed. Also, even when the exterior components 11a, 11b, 11c, 11d, 11e, and 11f are provided with different functions, a common manufacturing method and a common facility can be used for manufacture. For this reason, a reduction in cost required for a facility for manufacturing the exterior components 11a, 11b, 11c, 11d, 11e, and 11f can be achieved, and commonality of manufacturing facilities and flexibility can be achieved.

Still further, according to the wire harnesses 1a, 1b, 1c, 1d, 1e, and 1f in accordance with the respective embodiments of the present invention, the following operations and effects can be achieved compared with a structure of using an injection-molded product.

First, the molding tool 5 experimentally used in manufacturing each of the wire harnesses 1a, 1b, 1c, 1d, 1e, and 1f (=forming each of the exterior components 11a, 11b, 11c, 11d, 11e, and 11f) according to the respective embodiments of the present invention has a simple structure and is thus inexpensive, compared with a molding tool for manufacturing an injection-molded product. For this reason, compared with the structure of using an injection-molded product, a reduction in facility cost can be achieved. Furthermore, in the wire harnesses 1a, 1b, 1c, 1d, 1e, and 1f according to the respective embodiments of the present invention, a material (=the non-woven fabric) inexpensive compared with an injection-molded product can be applied, and therefore a reduction in material cost can be achieved.

Still further, in the process of forming the exterior components 11a, 11b, 11c, 11d, 11e, and 11f of the wire harnesses 1a, 1b, 1c, 1d, 1e, and 1f according to the respective embodiments of the present invention, the operation is easy compared with a method of causing a certain part of the wire 12 or the bundle of wires 12 to fit in an injection-molded product.

Still further, the exterior components 11a, 11b, 11c, 11d, 11e, and 11f formed from the non-woven fabric 2 can be made light compared with an injection-molded product. That is, while the injection-molded product is a filled-core solid (=a solid with its inside filled), each of the exterior components 11a, 11b, 11c, 11d, 11e, and 11f formed from the non-woven fabric 2 is not a completely filled-core solid but contains air. For this reason, the weight of each of the wire harnesses 1a, 1b, 1c, 1d, 1e, and 1f according to the respective embodiments of the present invention can be made lighter.

Still further, the exterior components 11a, 11b, 11c, 11d, 11e, and 11f formed from the non-woven fabric can be easily deformed compared with an injection-molded product. For example, when an injection-molded product is designed, the dimensions and shape are required to be considered according to fluctuations, due to tolerance, in shape and dimensions of a space where wires are routed. For this reason, designing is complex. By contrast, the exterior component formed from the non-woven fabric 2 can absorb tolerance by being deformed. For this reason, fluctuations due to tolerance in designing are not required to be considered.

Still further, in the structure using an injection-molded product, a clearance may be present between an inner circumferential surface of the injection-molded product and the certain part of the wire 12 or the bundle of wires 12. With this, the certain part of the wire 12 or the bundle of wires 12 collides with the inner circumferential surface of the injection-molded product due to vibration, shock, or the like, thereby causing a collision sound between the injection-molded product and the certain part of the wire 12 or the bundle of wires 12. This collision sound may be felt by a user as an unusual noise. Note that while a structure can be applied in which a sponge or the like is inserted inside the injection-molded product to prevent the occurrence of a collision noise, if this structure is taken the number of components, the number of types of components, and the number of operation processes are increased, thereby increasing component cost and manufacturing cost and extending the time required for manufacture.

By contrast, according to the wire harnesses 1a, 1b, 1c, 1d, 1e, and 1f in accordance with the respective embodiments of the present invention, the first parts 111a, 111b, 111c, 111d, 111e, and 111f of the exterior components 11a, 11b, 11c, 11d, 11e, and 11f each have a function of an injection-molded product (for example, a function of a shape keeping member or a protector), and the second parts 112a, 112b, 112d, and 112e and the third parts 112a, 112c, 112d, and 112e each have a function of a soundproofing material or a muffler material. As such, the exterior components 11a, 11b, 11c, 11d, 11e, and 11f each have both of the function of a shape keeping member or a protector and the function of a muffler material. And, the first parts 111a, 111b, 111c, 111d, 111e, and 111f, the second parts 112a, 112b, 112d, and 112e, and the third parts 113a, 113c, 113d, and 113f are formed from one material in the same process. For this reason, a reduction in the number of components, a reduction in the number of operation processes, and simplification of details of operation can be achieved. With this, a reduction in manufacturing time and a reduction in manufacturing cost can be achieved.

Still further, the wire harnesses 1a, 1b, 1c, 1d, 1e, and 1f according to the respective embodiments of the present invention achieve the following operations and functions compared with the structure in which a resin tape is coiled to form a certain shape.

An operation of coiling a resin tape around a certain part of the wire 12 or the bundle of wires 12 takes time and effort. Moreover, finished quality of the wire harnesses tends to be varied, thereby posing a problem in managing and keeping quality. Furthermore, the structure in which a resin tape is coiled around the circumference of the certain part of the wire 12 or the bundle of wires 12 has a problem in which the finished product does not look good.

By contrast, according to the wire harnesses 1a, 1b, 1c, 1d, 1e, and 1f in accordance with the respective embodiments of the present invention, the operation process of forming the exterior components 11a, 11b, 11c, 11d, 11e, and 11f is as described above, and compared with the operation of coiling a resin tape, time and effort for this operation can be omitted. Also, fluctuations of the finished wire harness solid can be eliminated, and quality can be easily managed and kept. Furthermore, appearance with quality equivalent to that of the structure of applying an injection-molded product can be obtained, thereby achieving an effect of good looking.

Still further, when the exterior components 11a, 11b, 11c, 11d, 11e, and 11f each have the function of a shape keeping member, an improvement in operability of operation of routing the wire harnesses 1a, 1b, 1c, 1d, 1e, and 1f according to the respective embodiments of the present invention inside a vehicle or the like, a reduction in the number of operation processes, a reduction in the number of components, and light weight can be achieved, which are specifically described as follows.

Conventionally, in a general operation of routing a wire harness, a branch line and a main line of the wire harness are disposed along a certain path set in a routing target member, and then are fixed to a certain member by a clamp or the like. Here, if the branch line and the main line of the wire harness are easily deformed, the following problems occur. First, it takes effort in the operation of disposing the main line and the branch line of the wire harness along the certain path. Also, in order to prevent the routed the main line and branch line of the wire harness from deviating from the certain path of the certain member, many clamps are required. Furthermore, with the main line and the branch line of the wire harness being routed, it is required to prevent any floating part. That is, if the branch line or the main line of the wire harness is in a floating state, the line may contact or collide with another member due to vibration during use and may be damaged, and also an unusual sound may occur. For this reason, the main line and the branch line of the wire harness are required to be routed over the entire length along the routing target member so as not to produce a floating part. With this, the routing path of the main line and branch line of the wire harness is limited by the shape of the routing target member and, for example, detouring or the like is required, thereby possibly increasing the lengths of the main line and the branch line of the wire harness. When the lengths of the main line and the branch line of the wire harness are increased, an increase in component cost and an increase in weight of the wire harness are invited, and also handling of the wire harness becomes inconvenient.

By contrast, like the wire harnesses 1a, 1b, 1c, 1d, 1e, and 1f according to the respective embodiments of the present invention, when the structure is such that an exterior component having a function of a shape keeping member is mounted on the branch line and the main line (=the certain part of the wire 12 or the bundle of wires 12), the following operations and effects are achieved. First, the operation of disposing the branch line and the main line of a relevant one of the wire harnesses 1a, 1b, 1c, 1d, 1e, and 1f according to the respective embodiments of the present invention along the certain path set in the routing target member becomes easy.

That is, with the relevant one of the exterior components 11a, 11b, 11c, 11d, 11e, and 11f, the main line and the branch line are kept in the shape of the certain path set in the routing target member. For this reason, if the branch line and the main line are placed on the routing target member, the state becomes such that the lines are naturally disposed along the certain path. And, since the shape of the certain path is kept by the relevant one of the exterior components 11a, 11b, 11c, 11d, 11e, and 11f, the number of clamps can be reduced. Furthermore, since the shape of the certain path is kept by the relevant one of the exterior components 11a, 11b, 11c, 11d, 11e, and 11f, at least part of the lines may be in a floating state, with the main line and the branch line being routed on the routing target member. That is, even if at least part of the branch line and the main line is in a floating state, the shape is kept in the certain shape. For this reason, the occurrence of a contact or collision with another member due to vibration, shock, or the like during use can be prevented. Therefore, the occurrence of a damage or an unusual sound can be prevented.

Furthermore, by applying the structure in which "at least part of the branch line and the main line is floated", flexibility of the routing path of the main line and the branch line is enhanced. For this reason, a reduction in the routing path of the main line and the branch line can be achieved. And, by achieving a reduction in the routing path, the lengths of the main line and the branch line can be shortened. With this, a reduction in component cost and light weight can be achieved, and also handling becomes easy. Also, when the lengths of the main line and the branch line are shortened, a reduction in time required for routing can be achieved, and also the number of clamps for mounting on the routing target member can be further decreased.

Still further, unlike the structure described in Patent Literature 1, in the wire harnesses 1a, 1b, 1c, 1d, 1e, and 1f according to the respective embodiments of the present invention, the form of the bundle of wires 12 (=the entire shape of the gathered wires 12, in other words, in which form the wires 12 are gathered) is not restricted. That is, the plurality of wires 12 may be gathered so as to have an approximately circular section as a whole, or may be gathered so as to have an approximately rectangular section. Unlike the structure described in Patent Literature 1, the structure is not restricted to the structure in which a flat circuit body is formed from a plurality of wires.

Next, operations and effects for each embodiment of the present invention are described.

In the wire harnesses 1a, 1b, and 1c according to the first to third embodiments of the present invention, the first parts 111a, 111b, and 111c formed on the surface layer part each have either one or both of the function of a protector and the function of a shape keeping member, and the second parts 112a and 112b and the third parts 113a and 113c each have any one or a plurality of functions of the function of a cushioning material, the function of a soundproofing material/muffler material, and the function of a heat insulating material.

That is, the first parts 111a, 111b, and 111c formed on the surface layer part of the exterior components 11a, 11b, and 11c, respectively, can keep the shape of the certain part of the wire 12 or the bundle of wires 12 (in particular, the shape of the axial line) in a certain shape (a shape formed by pressurizing and heating). Also, the first parts 111a, 111b, and 111c are each formed over the entire circumference of the exterior components 11a, 11b, and 11c. For this reason, even when a foreign substance contacts or collides with the surface of the exterior components 11a, 11b, and 11c from any direction, the foreign substance can be prevented from directly contacting or colliding with the certain part of the wire 12 or the bundle of wires 12, thereby protecting the certain part of the wire 12 or the bundle of wires 12.

Furthermore, since the first parts 111a, 111b, and 111c have a high wear resistance, even when a friction occurs between the first part and an exterior member, wear of the exterior components 11a, 11b, and 11c can be prevented or suppressed. For this reason, wear of the second parts 112a and 112b and the third parts 113a and 113c formed inside the first parts 111a, 111b, and 111c and the certain part of the wire or the bundle of wires 12 can be prevented or suppressed.

Also, in the wire harnesses 1a, 1b, and 1c according to the first to third embodiments of the present invention, the certain part of the wire 12 or the bundle of wires 12 is surrounded by and in contact with the second parts 112a and 112b or the third part 113c. The second parts 112a and 112b each have physical properties and the physical structure of the nonwoven fabric 2 before pressurizing and heating, and are softer than the first parts 111a, 111b, and 111c. The third parts 113a and 113c are harder than the second parts 112a and 112b but are softer than the first parts 111a, 111b, and 111c. As such, the certain part of the wire 12 or the bundle of wires 12 is surrounded by the second parts 112a and 112b or the third part 113c softer than the first parts 111a, 111b, and 111c as being elastically contacted therewith.

For this reason, even if vibration or shock is given to the exterior components 11a, 11b, and 11c, the second parts 112a and 112b and the third parts 113a and 113c mitigate vibration or shock, thereby preventing or suppressing transmission of vibration or shock to the certain part of wire 12 or the bundle of wires 12. As such, the second parts 112a and 112b and the third parts 113a and 113c each function as a cushioning material.

Also, since the certain part of the wire 12 or the bundle of wires 12 is elastically in contact with the second part 112a or the third part 113c and is surrounded thereby, even if vibration or shock is given to the exterior components 11a, 11b, and 11c, the certain part of the wire 12 or the bundle of wires is prevented from colliding with a member other than the second parts 112a and 112b or the third part 113c. For this reason, the occurrence of a collision sound (a sound that sounds like an unusual sound) produced by the certain part of the wire 12 or the bundle of wires 12 colliding with any member can be prevented. As such, the second parts 112a and 112b and the third parts 113a and 113c each function as a soundproofing material.

Also, since the second parts 112a and 112b and the third parts 113a and 113c can be said as soft porous parts, even when an unusual sound is generated, the generated unusual sound can be absorbed. As such, the second parts 112a and 112b and the third parts 113a and 113c each function as a muffler material.

Furthermore, the second parts 112a and 112b and the third parts 113a and 113c are in a state where fibers are intertwined with each other, and contain air inside. For this reason, thermal conductivity is small compared with that of a filled-core (=an inside-filled) object. Therefore, transmission of heat from outside of the exterior components 11a, 11b, and 11c to the certain part of the wire 12 or the bundle of wires 12 can be prevented or suppressed, and damage by heat to the certain part of the wire 12 or the bundle of wires 12 can be prevented or suppressed. As such, the second parts 112a and 112b and the third parts 113a and 113c each have a function as a heat insulating material.

The wire harnesses 1d, 1e, and 1f according to the fourth to sixth embodiments of the present invention can also achieve operations and effects similar to those of the wire harnesses 1a, 1b, and 1c according to the first to third embodiments of the present invention. And, furthermore, the following operations and effects can be achieved.

When the wire harnesses 1d, 1e, and 1f according to the fourth to sixth embodiments of the present invention are routed to the routing target member, a side where a relevant one of the first parts 111d, 111e, and 111f of the exterior components 11d, 11e, and 11f is not formed (=a side where a relevant one of the second parts 112d and 112e or the third part 113f is exposed) is oriented to the routing target member, and a side where a relevant one of the first parts 111d, 111e, and 111f is formed is oriented to an opposite side. With this, as with the wire harnesses 1a, 1b, and 1c according to the first to third embodiments of the present invention, the first parts 111d, 111e, and 111f each has a function as a protector. On the other hand, in each of the exterior components 11d, 11e, and 11f, a relevant one of the second parts 112d and 112e or the third part 113f faces the routing target member. For this reason, even if vibration or shock is given to a relevant one of the exterior components 11d, 11e, and 11f or the routing target member to cause the relevant one of the exterior components 11d, 11e, and 11f to collide with the routing target member, a relevant one of the second parts 112d and 112e or the third part 113f makes contact with the routing target member, and therefore no collision sound occurs between the routing target member and the relevant one of the exterior components 11d, 11e, and 11f (or such sound hardly occurs).

Also when the wire harnesses 1d, 1e, and 1f according to the fourth to sixth embodiments of the present invention are routed to a groove-shaped path provided to the routing target member, the following scheme is taken. A part where a relevant one of the second parts 112d and 112e or the third part 113f of the exterior components 11d, 11e, and 11f is exposed fits in the groove-shaped path so as to be in contact with the inner circumferential surface of the path. Then, the relevant one of the first parts 111d, 111e, and 111f is exposed from an opening of the groove-shaped path. With this, the relevant one of the second parts 112d and 112e or the third part 113f of the exterior components 11d, 11e, and 11f elastically makes contact with the inner circumferential surface of the groove-shaped path of the routing target member. For this reason, even if vibration or shock is given to the routing target member, the occurrence of a collision sound or the like can be prevented between the relevant one of the exterior components 11d, 11e, and 11f and the routing target member. And, the exposed first parts 111d, 111e, and 111f each have a function of a protector.

Furthermore, like the wire harnesses 1b and 1e according to the second embodiment and the fifth embodiment of the present invention, in the structure in which no third part is formed, the function as a cushioning material can be particularly improved. That is, expect the relatively hardest first parts 111b and 111e, all become a relevant one of the relatively softest second parts 112b and 112e, and the dimensions of the second parts 112b and 112e are increased. For this reason, the function as a cushioning material protecting the certain part of the wire 12 or the bundle of wires 12 is increased.

On the other hand, like the wire harnesses 1c and 1f according to the third embodiment and the sixth embodiment of the present invention, when the structure is such that no second part is formed and only the first parts 111c and 111f and the third parts 113c and 113f are formed, respectively, the binding strength of the non-woven fabric 2 formed in the exterior components 1c and 11f can be increased. That is, in the third parts 113c and 113f, the binder component of the binder fiber is molten and solidified to bind the base fiber and the core fabric of the binder fabric together.

For this reason, in the third parts 113c and 113f, for example, in the structure as shown in FIG. 5(a) in which the plate-shaped (or block-shaped) non-woven fabric 2 is bent to be mounted so as to interpose the wires, the surfaces abutting and in contact with each other are bound together as a whole. In the structure as shown in FIG. 5(b) in which the sheet-shaped non-woven fabric 2 is mounted so as to be coiled, both sides of the coiled non-woven fabric 2 are bound together over their entirety. In the structure as shown in FIG. 5(c) in which the stick-shaped non-woven fabric 2 in which the slit 21 is formed, the entire inner surface of the slit 21 are bound together. In the structure as shown in FIG. 5(d) in which two non-woven fabrics 2 are used to interpose, the surfaces in contact with each other are bound together as a whole. As such, since the area in which the non-woven fabrics 2 are bound together is increased, and therefore the binding strength is increased.

And, like the wire harnesses 1a and 1d according to the first embodiment and the fourth embodiment of the present invention, by forming both of the second parts 112a and 112d and the third parts 113a and 113d, respectively, the binding strength between the non-woven fabrics 2 formed in the exterior components 11a and 11d, respectively, can be ensured, and the function as a cushioning material can be provided (note that while the third parts 113a and 113d also have the function as a cushioning material, the function as a cushioning material is higher herein than the structure in which only the third part is formed).

Next, exterior components according to other embodiments of the present invention are described.

Figure 9A:
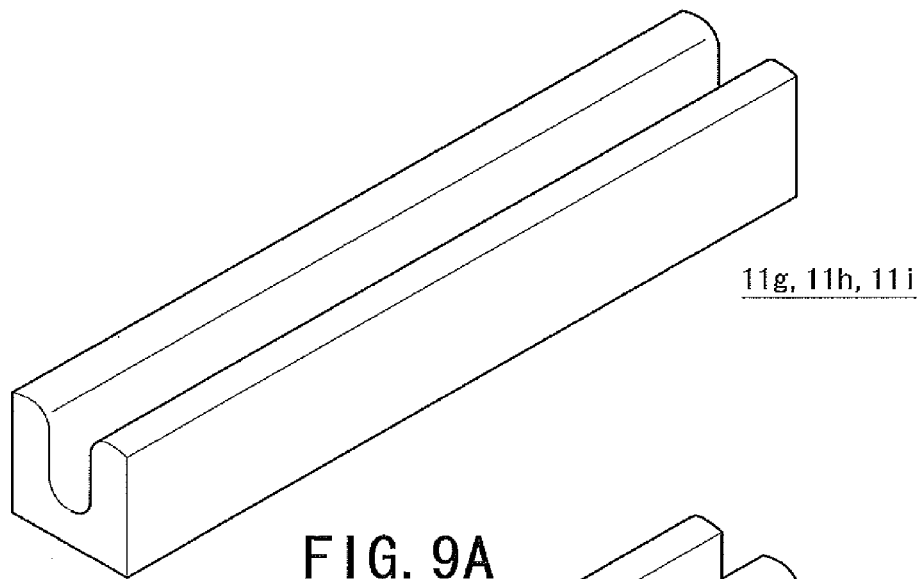
FIG. 9 shows external perspective views each schematically showing the structure of an exterior component of the wire harness according to each embodiment of the present invention, FIG. 9(a) showing the exterior component according to seventh to ninth embodiments of the present invention, FIG. 9(b) showing the exterior component according to tenth to twelfth embodiments of the present invention, and FIG. 9(c) showing a state in which a certain part of the bundle of wires of the wire harness is accommodated in the exterior component according to the seventh to ninth embodiments of the present invention.
Figure 9B:
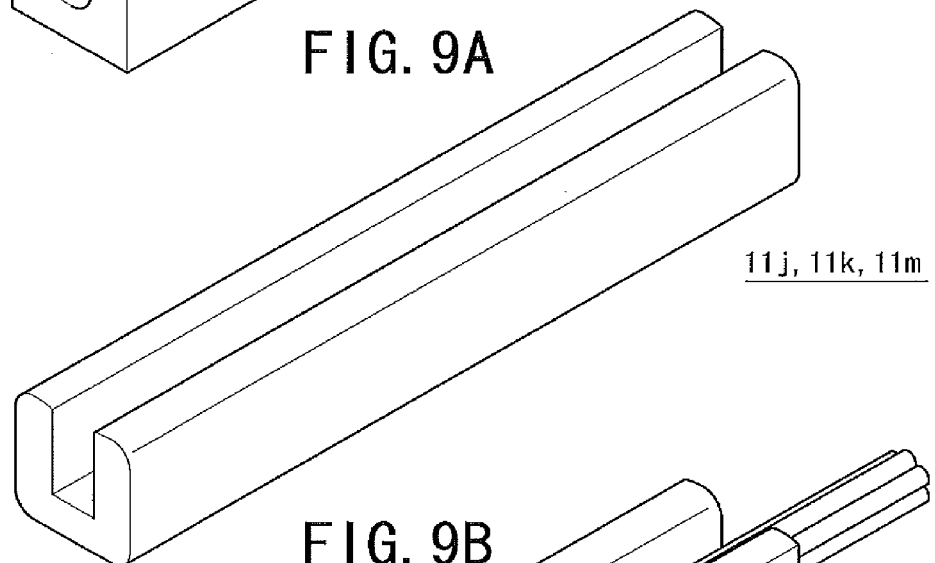
Figure 9C:
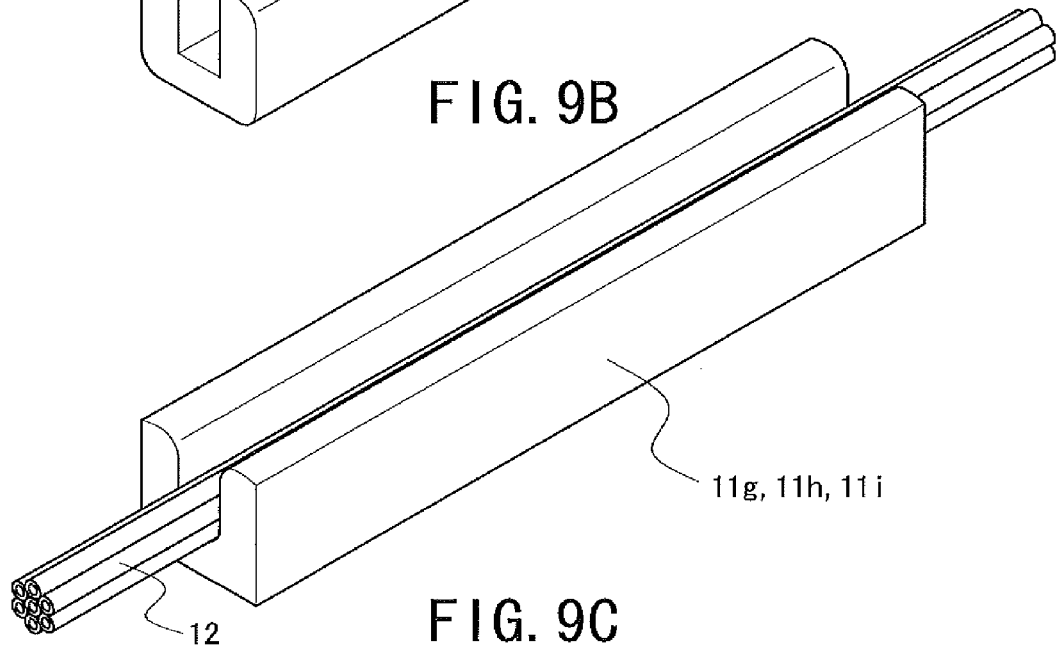
Figure 10A:
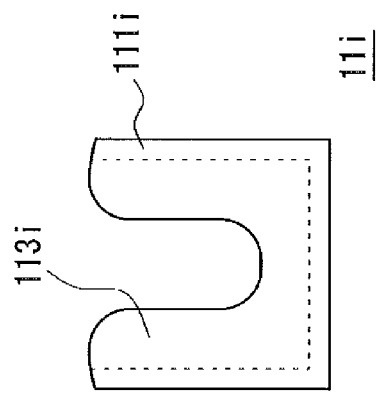
FIG. 10(a) shows a sectional structure of the exterior component of the wire harness according to the seventh embodiment of the present invention.
Figure 10B:
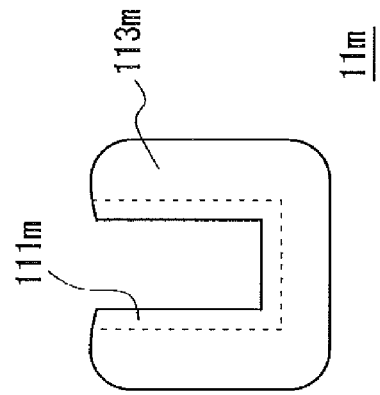
FIG. 10(b) shows a sectional structure of the exterior component according to the eighth embodiment.
Figure 10C:
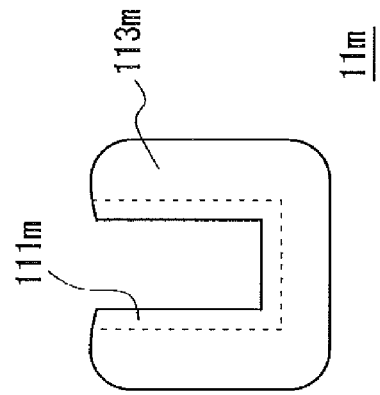
FIG. 10(c) shows a sectional structure of the exterior component according to the ninth embodiment.
Figure 10D:
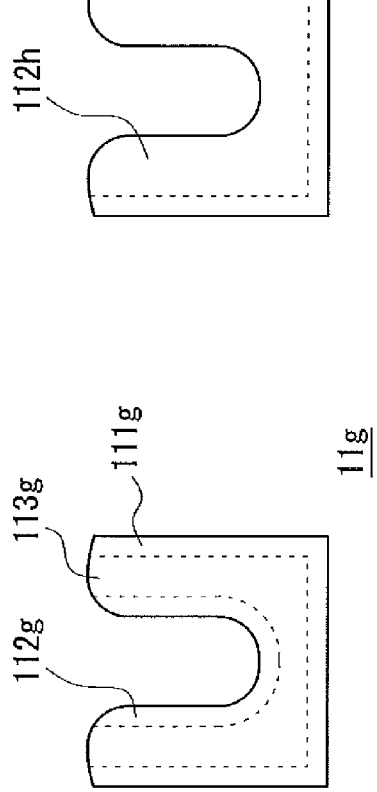
FIG. 10(d) shows a sectional structure of the exterior component according to the tenth embodiment.
Figure 10E:
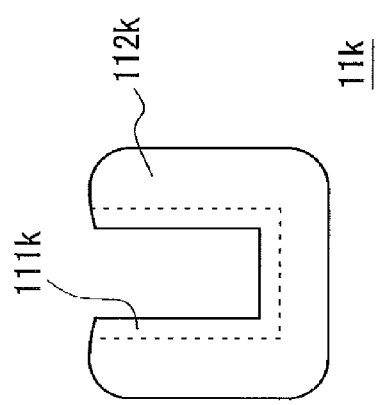
FIG. 10(e) shows a sectional structure of the exterior component according to the eleventh embodiment.
Figure 10F:
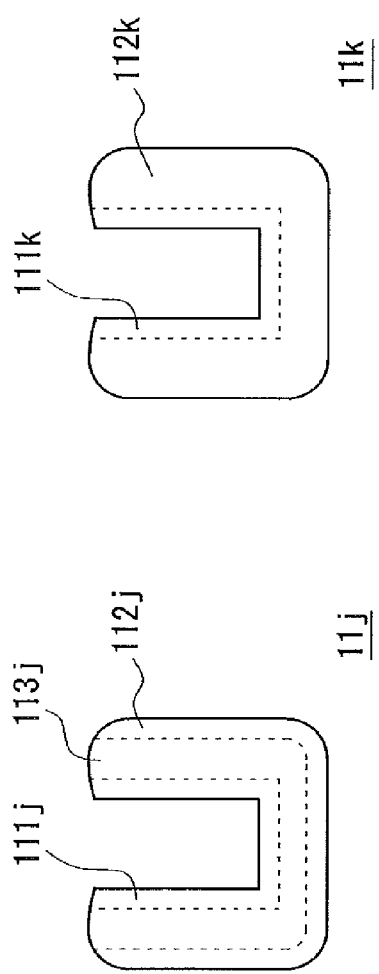
FIG. 10(f) shows a sectional structure of the exterior component according to the twelfth embodiment.

FIG. 9 shows external perspective views schematically showing the structure of exterior components 11g, 11h, 11i, 11j, 11k, and 11m of wire harnesses according to respective embodiments of the present invention. FIG. 9(a) shows exterior components 11g, 11h, and 11i according to seventh to ninth embodiments of the present invention, FIG. 9(b) shows exterior components 11j, 11k, and 11m according to tenth to twelfth embodiments of the present invention. Also, FIG. 9(c) shows a state in which a certain part of a bundle of wires of the wire harness is accommodated in the exterior component according to each of the seventh to ninth embodiments of the present invention. FIG. 10 shows sectional structures of the exterior components 11g, 11h, 11i, 11j, 11k, and 11m according to the respective embodiments of the present invention. Specifically, FIG. 10(a) shows the exterior component 11g according to the seventh embodiment of the present invention, FIG. 10(b) shows the exterior component 11h according to the eighth embodiment, FIG. 10(c) shows the exterior component 11i according to the ninth embodiment, FIG. 10(d) shows the exterior component 11j according to the tenth embodiment, FIG. 10(e) shows the exterior component 11k according to the eleventh embodiment, and FIG. 10(f) shows the exterior component 11m according to the twelfth embodiment.

First, a common structure of the exterior components 11g, 11h, 11i, 11j, 11k, and 11m according to the respective embodiments of the present invention is described. The exterior components 11g, 11h, 11i, 11j, 11k, and 11m according to the respective embodiments are members each disposed to a member where a wire harness is routed (which may be hereinafter referred to as a "routing target member") and can accommodate a certain part of a wire or a bundle of wires of the routed wire harness (=a certain part of a main line or a branch line of the wire harness).

As shown in FIG. 9, the exterior components 11g, 11h, 11i, 11j, 11k, and 11m according to the respective embodiment of the present invention each have an approximately cylindrical structure with its one side being open. And, in its inside, a certain part of the wire or the bundle of wires of the wire harness can be accommodated. For example, a stick-shaped structure with its section being in an approximately "U" shape or "C" shape" can be applied. Also, the structure may be such that it is branched (in other words, braches are merged) at midpoint in an axial line direction. In essence, the structure can be any as long as it can accommodate therein a wire or a bundle of wires of a wire harness. And, the sectional dimensions and shape ("sectional" is assumed to mean a section obtained by cutting in a direction at a right angle to the axial line direction of a wire(s) to be accommodated; the same applies to the following unless otherwise specified), the shape and dimensions of the axial line, the form of branching and merging, and others are set as appropriate according to the wire or the bundle of wires of the wire harness to be accommodated. Note that for convenience of description, a surface on a side of a region where the wire or the bundle of wires of the wire harness is accommodated is referred to as an "inner circumferential surface" and a surface opposite thereto is referred to as a "circumferential surface".

The exterior components 11g, 11h, 11i, 11j, 11k, and 11m according to the respective embodiments of the present invention each have one or a plurality of functions of (1) a function of protecting a certain part of the wire or the bundle of wires of the wire harness (=a function of a "protector"), (2) a function of preventing the wire or the bundle of wires of the routed wire harness from deviating from the routed position, in other words, keeping the shape of the wire or the bundle of wires of the wire harness in a certain shape (=a function of a "shape keeping member"), (3) a function of preventing or suppressing the occurrence of an unusual noise (=a function of a "muffler" or a "soundproofing material"), (4) a function of preventing a shock from being given to the wire or the bundle of wires of the wire harness (a function of a "cushioning material"), (5) a function of preventing transmission of heat to the wire or the bundle of wires of the wire harness (=a function of a "heat insulating material"), and (6) a function of gathering the bundle of wires of the wire harness to prevent them from coming apart (=a function of a "binding material").

And, parts having different hardnesses are formed in the exterior component according to each embodiment of the present invention. That is, a part having a certain hardness and a part softer compared with this part having the certain hardness are formed.

In the exterior components 11g and 11j according to the seventh embodiment and the tenth embodiment of the present invention, respectively, parts of three different types having different hardnesses are formed. Relatively hardest parts (=the "parts having the certain hardness) are referred to as "first parts 111g and 111j". Relatively softest parts (=the "parts softer than the parts having the certain hardness") are referred to as "second parts 112g and 112j". Parts having an intermediate hardness between that of the "first parts 111g and 111j" and that of the "second parts 112g and 112j" (the parts also correspond to the "parts softer than the parts having the certain hardness") are referred to as "third parts 113g and 113j".

In the exterior components 11h and 11k according to the eighth embodiment and the eleventh embodiment of the present invention, respectively, parts of two different types having different hardnesses are formed. Relatively hard parts (=the "parts having the certain hardness") are referred to as "first parts 111h and 111k". Relatively soft parts (=the "parts softer than the parts having the certain hardness") are referred to as "second parts 112h and 112k". Similarly, in the exterior components 11i and 11m according to the ninth embodiment and the twelfth embodiment of the present invention, respectively, parts of two types having different hardnesses are formed. Relatively hard parts (=the "parts having the certain hardness") are referred to as "first parts 111i and 111m". Relatively soft parts (=the "parts softer than the parts having the certain hardness") are referred to as "third parts 113i and 113m".

And, the exterior components 11g and 11j according to the seventh embodiment and the tenth embodiment of the present invention each have a section where a relevant one of the first parts 111g and 111j, a relevant one of the second parts 112g and 112j, and a relevant one of the third parts 113g and 113j appear. The exterior components 11h and 11k according to the eighth embodiment and the eleventh embodiment of the present invention each have a section where a relevant one of the first parts 111h and 111k and a relevant one of the second parts 112h and 112k appear. The exterior components 11i and 11m according to the ninth embodiment and the twelfth embodiment of the present invention each have a section where a relevant one of the first parts 111i and 111m and a relevant one of the third parts 113i and 113m appear.

Note that the first parts 111g, 111h, 111i, 111j, 111k, and 111m of the exterior components 11g, 11h, 11i, 11j, 11k, and 11m according to the respective embodiments of the present invention have an identical physical structure. The second parts 112g, 112h, 112j, and 112k of the exterior components 11g, 11h, 11i, 11j, and 11k according to the seventh embodiment, the eighth embodiment, the tenth embodiment, and the eleventh embodiment of the present invention has an identical physical structure. The third parts 113g, 113i, 113j, and 113m of the exterior components 11g, 11i, 11j, and 11m according to the seventh embodiment, the ninth embodiment, the tenth embodiment, and the twelfth embodiment of the present invention has an identical physical structure.

The exterior components 11g, 11h, 11i, 11j, 11k, and 11m according to the respective embodiments of the present invention are formed from a non-woven fabric made of a thermoplastic material. And, the first parts 111g, 111h, 111i, 111j, 111k, and 111m, the second parts 112g, 112h, 112j, and 112k, and the third parts 113g, 113i, 113j, and 113m are not formed from separate non-woven fabrics having different hardnesses (or different types of non-woven fabrics) but are formed from a single non-woven fabric (or one type of non-woven fabric). That is, the "part having the certain hardness" and the "part softer than the part having the certain hardness" are formed integrally from an identical material.

As this non-woven fabric, one having a base fiber and a binder fiber is applied. The base fiber is formed from a thermoplastic resin material having a certain melting point. The binder fiber has a core fiber and a binder component layer formed on the circumference of the core fiber. And, the core fiber is formed from a thermoplastic resin material identical to that of the base fiber. The binder component layer is formed from a thermoplastic resin material whose melting point is lower than the melting points of the base fiber and the core fiber.

Furthermore, the non-woven fabric before formed into an exterior component can be elastically deformed. In particular, the one compressively deformable so that an apparent volume is decreased is applied. And, preferably, the orientations of axial lines of the base fiber and the binder fiber contained in the non-woven fabric are random (=have no regularity).

When the base fiber and the binder fiber of the non-woven fabric as structured above are heated to a temperature equal to or higher than a certain temperature, they are in a plastically deformable state due to thermo plasticity. In particular, when they are heated to a temperature equal to or higher than the melting point of the binder component of the binder fiber and lower than the melting points of the base fiber and the core fiber of the binder fiber, the base fiber and the core fiber of the binder fiber become in a plastically deformable state due to thermo plasticity while a solid state (=a fiber state) is being kept, but the binder component of the binder fiber is molten to become a fluidizable state. In this state, the non-woven fabric is kept in a solid state as a whole, and becomes in a plastically deformable state due to thermo plasticity of the base fiber and the core fiber of the binder fiber.

For convenience of description, a temperature band between the melting point of the binder component of the binder fiber and the melting point of the core fiber of the binder fiber (however, not including the melting points of the base fiber and the core fiber of the binder fiber) is referred to as a "first temperature band".

When the non-woven fabric as described above is heated to a temperature in the first temperature band, the binder component of the binder fiber is molten to flow between the base fiber and the core fiber of the binder fiber. Then, when the non-woven fabric is cooled to a temperature lower than those in the first temperature band, the molten binder component is solidified. Then, the base fiber and the core fiber of the binder fiber are bound together by the solidified binder component. That is, like an adhesive or a hot-melt resin, the solidified binder component binds the base fiber and the core fiber of the binder fiber together.

Therefore, the non-woven fabric as structured above is formed in a certain shape as being heated to a temperature in the first temperature band and, thereafter, when the non-woven fabric is cooled to a temperature lower than those in the first temperature band, the formed shape is kept. Furthermore, since the molten binder component is solidified to bind the base fiber and the core fiber of the binder fiber together, the non-woven fabric becomes hardened compared with the state before the non-woven fabric is heated to a temperature in the first temperature band.

As the base fiber and the core fiber of the binder fiber of the non-woven fabric as structured above, a fiber formed from PET (polyethylene terephthalate) can be applied. Also, as the binder component of the binder fiber, a copolymer resin of PET and PEI (polyethylene isophthalate) can be applied. And, to the binder fiber, a structure can be applied in which the binder component layer made of a copolymer resin of PET and PEI is formed on the circumferential surface of the base fiber made of PET. The melting points of the base fiber and the core fiber (=PET) of the binder fiber of the non-woven fabric as structured above are approximately 250 degrees Celsius. Also, the melting point of the binder component (=the melting point of the copolymer resin of PET and PEI) is approximately 110 degrees Celsius to 150 degrees Celsius. Therefore, the first temperature band of the non-woven fabric to which these materials are applied is 110 degrees Celsius to 250 degrees Celsius.

Note that the materials of the base fiber and the binder fiber are not restricted to the materials described above. In essence, the base fiber and the core fiber of the binder fiber and binder component layer of the binder fiber can be made of a thermoplastic material, and the melting points of the base fiber and the core fiber of the binder fiber can be higher than the melting point of the binder component of the binder fiber. Therefore, not only PET and the copolymer resin of PET and PEI but also various thermoplastic materials can be applied.

In the structure in which this non-woven fabric is applied to the exterior components 11g, 11h, 11i, 11j, 11k, and 11m, according to the respective embodiments of the present invention, the first parts 111g, 111h, 111i, 111j, 111k, and 111m, the second parts 112g, 112h, 112j, and 112k, and the third parts 113g, 113i, 113j, and 113m have the following structures as below.

The first parts 111g, 111h, 111i, 111j, 111k, and 111m are parts having densities of the base fiber and the binder fiber higher than that of the non-woven fabric in a state before being formed in the exterior components 11g, 11h, 11i, 11j, 11k, and 11m according to the respective embodiments of the present invention and having the base fiber and the core fiber of the binder fiber bound together by the binder component. For this reason, the first parts 111g, 111h, 111i, 111j, 111k, and 111m each have a hardness harder than that of the non-woven fabric in a state before being formed in the exterior component (in other words, the first parts each have a high stiffness and are less prone to be deformed).

Furthermore, the first parts 111g, 111h, and 111i of the exterior components 11g, 11h, and 11i according to the seventh embodiment to the ninth embodiment of the present invention have axial lines of the base fiber and the core fiber of the binder fiber oriented as a whole in a direction approximately parallel to a circumferential surface. At least, compared with other parts, the first parts 111g, 111h, and 111i have a high percentage of the base fiber and the core fiber of the binder fiber oriented in a direction parallel to the circumferential surface. On the other hand, the first parts 111j, 111k, and 111m of the exterior components 11j, 11k, and 11m according to the tenth embodiment to the twelfth embodiment of the present invention have axial lines of the base fiber and the core fiber of the binder fiber oriented as a whole in a direction approximately parallel to an inner circumferential surface. At least, compared with other parts, the first parts 111j, 111k, and 111m have a high percentage of the base fiber and the core fiber of the binder fiber oriented in a direction parallel to the inner circumferential surface.

The second parts 112g, 112h, 112j, and 112k are parts having physical properties of the non-woven fabric before being formed in the exterior components 11g, 11h, 11j, and 11k according to the respective embodiments of the present invention. That is, they are parts where the non-woven fabric is simply compressed and deformed. Also, the binder component of the binder fiber is not molten and solidified. For this reason, the state is not such that "the base fiber and the core fiber of the binder fiber are bound together by the binder component". And, if the directions of the axial lines of the base fiber and the core fiber of the binder fiber are random before the fibers are formed in the exterior components 11g, 11h, 11j, and 11k according to the respective embodiments of the present invention, the directions are kept in a random state even after the fibers are formed in the exterior components 11g, 11h, 11j, and 11k according to the respective embodiments of the present invention.

The third parts 113g, 113i, 113j, and 113m are parts in which the base fiber and the core fiber of the binder fiber are bound together by the binder component. Note that the axial line directions of the base fiber and the binder fiber are identical to those of the second parts 112g, 112h, 112j, and 112k and, unlike the first parts 111g, 111h, 111i, 111j, 111k, and 111m, the axial line directions are not "oriented to a direction parallel to the surface of the accommodation component as a whole". Also, the degree of compressive deformation is small compared with those of the second parts 112g, 112h, 112j, and 112k. As such, in each of the third parts 113g, 113i, 113j, and 113m, since the axial lines of the base fiber and the core fiber of the binder fiber are coupled together by the binder component, the third part is harder than it is before being formed in a relevant one of the exterior components 11g, 11i, 11j, and 11m according to the respective embodiments of the present invention and is harder than those of the second parts 112g, 112h, 112j, and 112k after being formed in a relevant one of the exterior components 11g, 11h, 11j, and 11k according to the respective embodiments of the present invention.

On the other hand, the densities of the base fiber and the core fiber of the binder fiber are smaller than those of the first parts 111g, 111h, 111i, 111j, 111k, and 111m. And, the directions of the axial lines of the base fiber and the core fiber of the binder fiber are not aligned with a direction parallel to the surface (=the inner circumferential surface of the circumferential surface) of a relevant one of the exterior components 111g, 111i, 111j and 111m. For this reason, the third parts 113g, 113i, 113j, and 113m are softer than the first parts 111g, 111h, 111i, 111j, 111k, and 111m.

With the structure described above, the third parts 113g, 113i, 113j, and 113m are softer than the first parts 111g, 111h, 111i, 111j, 111k, and 111m and harder than the second parts 112g, 112h, 112j, and 112k.

Therefore, in the exterior components 11g and 11j according to the seventh embodiment and the tenth embodiment of the present invention, the first part 111g and 111j are the hardest, the second parts 112g and 112j are the softest, and the third parts 113g and 113j have an intermediate hardness between those of the first parts 111g and 111j and the second parts 112g and 112j. In the exterior components 11h and 11k according to the eighth embodiment and the eleventh embodiment of the present invention, the first parts 111h and 111k are hard, and the second parts 112h and 112k are soft. In the exterior components 11i and 11m according to the ninth embodiment and the thirteenth embodiment of the present invention, the first part 111i and 111m are hard, and the third parts 113i and 113m are soft. As such, in the accommodation components 11g, 11h, 11i, 11j, 11k, and 11m of the wire harnesses according to the respective embodiments of the present invention, parts having different hardnesses are formed.

Note that a structure can be applied in which the dimensions, shape, position, and range of each of the first parts 111g, 111h, 111i, 111j, 111k, and 111m, the second parts 112g, 112h, 112j, and 112k, and the third parts 113g, 113i, 113j, and 113m are varied according to the functions of the exterior components 11g, 11h, 11i, 11j, 11k, and 11m according to the respective embodiments of the present invention and other factors.

For example, when the first parts 111g, 111h, 111i, 111j, 111k, and 111m each have a function of a protector, a structure can be applied in which the first parts 111g, 111h, 111i, 111j, 111k, and 111m are each formed only in a part where a part particularly desired to be protected in the certain part of the wire or the bundle of wires of the wire harness. Also, the dimensions of the first parts 111g, 111h, 111i, 111j, 111k, and 111m are set according to the strength to be provided to the exterior components 11g, 11h, 11i, 11j, 11k, and 11m, according to the respective embodiments of the present invention. Similarly, when the first parts 111g, 111h, 111i, 111j, 111k, and 111m each have a function of a shape keeping member, a structure can be applied in which the first parts 111g, 111h, 111i, 111j, 111k, and 111m are each formed to a part with its shape particularly desired to be kept. Also, the dimensions of the first parts 111g, 111h, 111i, 111j, 111k, and 111m are set according to the stiffness (=resistance to deformation) to be provided to the exterior components 11g, 11h, 11i, 11j, 11k, and 11m, respectively, according to the respective embodiments of the present invention.

Furthermore, by changing the dimensions of the second parts 112g, 112h, 112j, and 112k and the third parts 113g, 113i, 113j, and 113m, the degrees of a function of a certain part of the wire or the bundle of wires of the wire harness as a cushioning material, a function thereof as a muffler/soundproofing material, and a function thereof as a heat insulating material can be changed.

Next, methods of manufacturing the exterior components 11g, 11h, 11i, 11j, 11k, and 11m according to the respective embodiments of the present invention are described. Note herein that a method of manufacturing the exterior component 11g according to the seventh embodiment of the present invention is mainly described and, as for the methods of manufacturing the exterior components 11h, 11i, 11j, 11k, and 11m according to the eighth to twelfth embodiments of the present invention, only a structure different from that of the method of manufacturing the exterior component 11g according to the seventh embodiment of the present invention is described.

Figure 11:
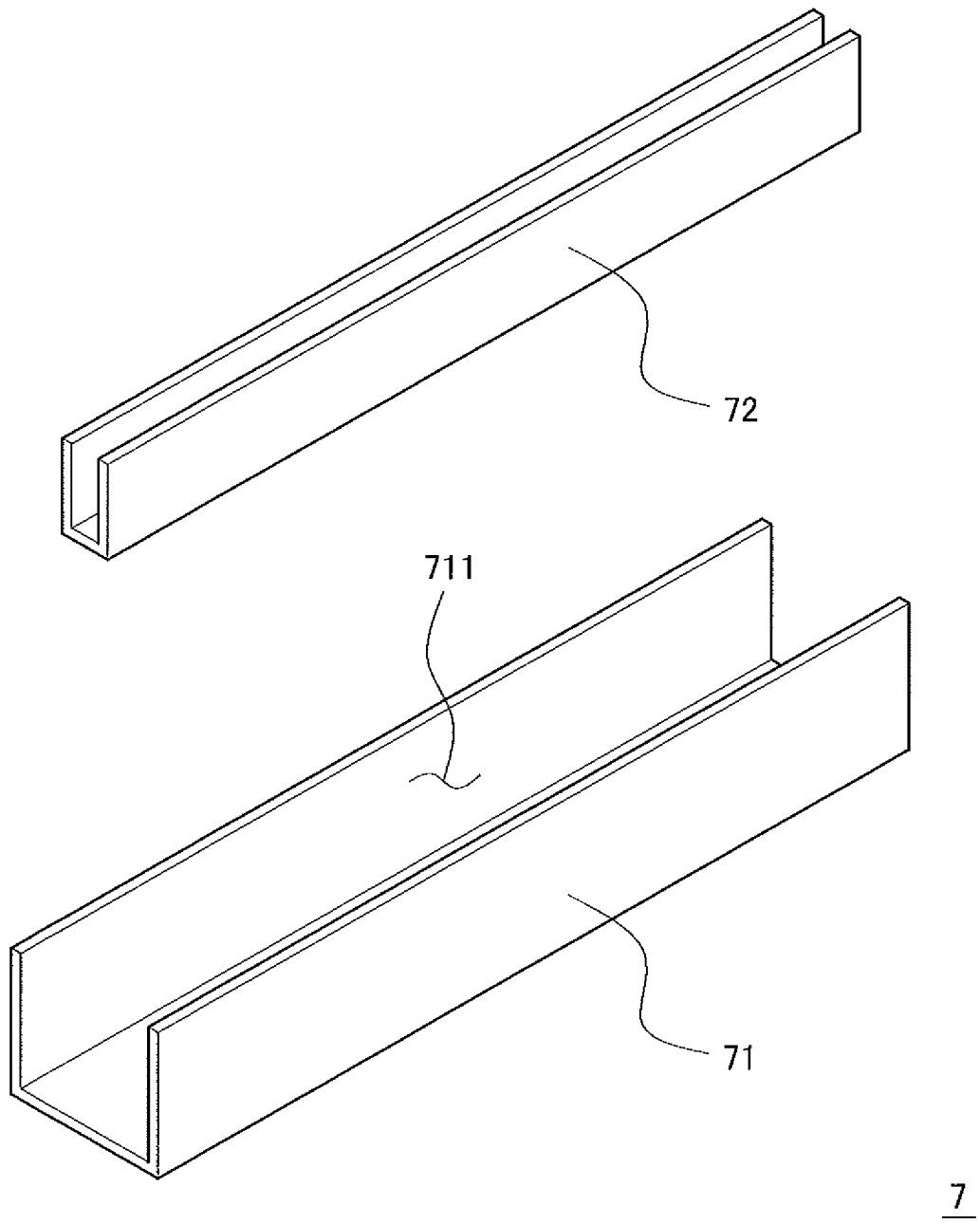
FIG. 11 is an external perspective view schematically showing the structure of a former for use in a method of manufacturing the exterior component according to the first embodiment of the present invention.

In the method of manufacturing the exterior component 11g according to the seventh embodiment of the present invention, a molding tool 7 is used. The molding tool 7 has a first molding tool 71 and a second molding tool 72. FIG. 11 is an external perspective view schematically showing a structure of the molding tool 7 for use in the method of manufacturing the exterior component 11g according to the first embodiment of the present invention.

The molding tool 7 is a tool that heats and pressurizes the non-woven fabric 2 to form the exterior component 11g. As shown in FIG. 11, a recessed part 711 that can accommodate the non-woven fabric 2 is formed in the first molding tool 7. The dimensions and shape of an inner circumferential surface of this recessed part 711 are set to be equal and identical (or approximately equal and identical) to the dimensions and shape of a circumferential surface of the exterior component 11g after being formed. The second molding tool 72 is an approximately stick-shaped member. And, the dimensions and shape of the second molding tool 72 are set to be equal and identical (or approximately equal and identical) to the dimensions and shape of the inner circumferential surface of the exterior component 11g. And, when the second molding tool 72 fits in the recessed part 711 of the first molding tool 71, the dimensions and shape of a space formed between the inner circumferential surface of the first molding tool 71 and the circumferential surface of the second molding tool 72 is equal and identical (or approximately equal and identical) to the shape of the exterior component 11g after forming.

Furthermore, the first molding tool 71 is preferably configured to be provided with heating means (not shown) capable of heating to a "certain temperature". Note that the "certain temperature" will be described further below. As the heating means, various known heating means can be applied. For example, an electrically heated wire is applied as the heating means, and a structure in which this electrically heated wire is buried inside the first molding tool 71 or a structure in which the electrically heated wire is mounted on the first molding tool 71 can be applied. Also, a structure can be applied in which, for example, a path (for example, a hole) allowing a fluid to pass through is formed inside the first molding tool 71 and the temperature-adjusted fluid (gas (such as air or superheated steam) or liquid (such as oil)) is let pass through this path. As such, the heating means can have a structure capable of heating the first molding tool 71 to the "certain temperature", and its type and structure are not restricted.

Figure 12A:
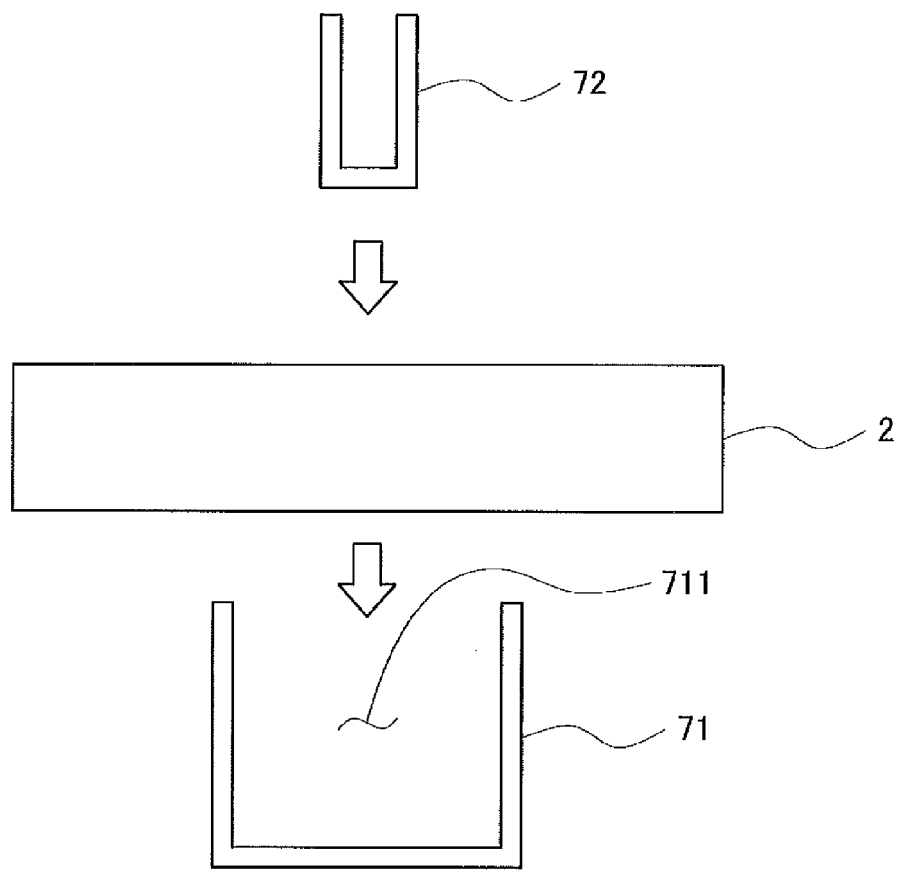
FIG. 12 shows sectional views schematically showing a method of manufacturing the exterior component according to the seventh embodiment of the present invention, FIG. 12(a) showing a process of accommodating a non-woven fabric in a former, and FIG. 12(b) showing a process of pressurizing the non-woven fabric during heating.
Figure 12B:
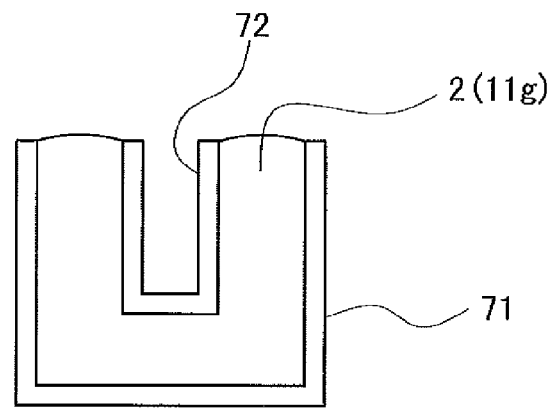

FIG. 12 shows sectional views schematically showing a method of manufacturing the exterior component 11g according to the seventh embodiment of the present invention. Specifically, FIG. 12(a) is a view showing a process of accommodating the non-woven fabric 2 in the molding tool 7, and FIG. 12(b) is a view showing a process of pressurizing the non-woven fabric 2 during heating by the molding tool 7.

First, as shown in FIG. 12(a), the non-woven fabric 2 is accommodated in the recessed part 711 of the first molding tool 71, and also the second molding tool 72 is inserted inside the non-woven fabric 2. With this, as shown in FIG. 12(b), the non-woven fabric 2 is pressurized by the molding tool 71 to be compressively deformed. And, the sectional dimensions and shape of the non-woven fabric 2 are equal and identical to the dimensions and shape of a region formed between the inner circumferential surface of the recessed part 711 of the first molding tool 71 and the circumferential surface of the second molding tool 72.

Then, with the state shown in FIG. 12(b) being kept, the first molding tool 71 is heated by the heating means to the "certain temperature". Then, this state is kept over a "certain time". That is, heating and pressurizing the non-woven fabric 2 continues over the "certain time".

The "certain temperature" is a temperature at which the non-woven fabric 2 can be heated to a temperature in the "first temperature band". For example, as the "certain temperature", a temperature equal to or higher than a temperature in the "first temperature band" is applied.

Also, the "certain time" is as follows. The time is when a part in contact with the first molding tool 71 and a part nearby (that is, a part as the circumferential surface of the exterior component 11g according to the seventh embodiment of the present invention and a part nearby) of the non-woven fabric 2 reach a temperature in the first temperature band but a part in contact with the second molding tool 72 and a part nearby (that is, a part as an inner circumferential surface of the accommodation component 11g of the wire harness according to the first embodiment of the present invention and a part nearby) do not reach a temperature in the first temperature band.

Next, after a lapse of the "certain time", heating of the first molding tool 71 is stopped, and the heated and pressurized non-woven fabric 2 (that is, the formed exterior component 11g according to the first embodiment of the present invention) is cooled. Note that a cooling method is not particularly restricted. For example, a method of storing them in a refrigerator, a method of spraying gas at room temperatures or a low temperature, a method of leaving them at room temperatures, or the like can be applied. Also, the formed exterior component 11g according to the seventh embodiment of the present embodiment may be cooled after being removed from the molding tool 7, or may be cooled as being accommodated in the molding tool 7.

According to the manufacturing method described above, the exterior component 11g having the first part 111g, the second part 112g, and the third part 113g according to the seventh embodiment of the present invention is formed with the following mechanism.

When the state becomes such that the non-woven fabric 2 is accommodated in the molding tool 7 (=when the state becomes such that the non-woven fabric 2 is interposed between the first molding tool 71 and the second molding tool 72), the non-woven fabric 2 is compressively deformed to have the dimensions and shape of the exterior component 11g to be formed.

Then, in this state, when the first molding tool 71 is heated to the "certain temperature", a part of the non-woven fabric 2 with a certain depth from a surface in contact with the first molding tool 71 reaches a temperature in the first temperature band. The part reaching the temperature in the first temperature band is in a state of being easily plastically deformed due to thermo plasticity, and therefore the part is plastically deformed (here, compressively deformed) by heating and pressurizing due to thermo plasticity. Note that since the non-woven fabric 2 has a high temperature on an circumferential surface side (=a side in contact with the first molding tool) compared with an inner circumferential surface side (=a side in contact with the second molding tool), the degree of plastic deformation due to thermo plasticity in the part reaching the temperature in the first temperature band is larger from the inner circumferential surface side toward the circumferential surface side. Therefore, the densities of the base fiber and the binder fiber at this part of the non-woven fabric 2 are high on the circumferential surface side.

And, particularly on the part of the non-woven fabric 2 in contact with the first molding tool and the part nearby (that is, on a surface layer part of the circumferential surface), the axial lines of the base fiber and the binder fiber of the non-woven fabric 2 are oriented, by heating and pressurizing, to a direction at a right angle with respect to a compressing direction as a whole (that is, a direction parallel to the circumferential surface). The part where the axial lines of the base fiber and the binder fiber of the non-woven fabric 2 are oriented to the direction parallel to the surface of the exterior component 11g particularly has a high density of the base fiber and the core fiber of the binder fiber, compared with other parts.

Furthermore, in the part of the non-woven fabric 2 reaching the temperature in the first temperature band, the binder component of the binder fiber is molten, and the molten binder component flows out between the base fiber and the core fiber of the binder fiber. Thereafter, when the non-woven fabric 2 is cooled to a temperature lower than those in the first temperature band, the molten and flowing binder component is solidified to bind the base fiber and the core fiber of the binder fiber together.

With this, in the part of the non-woven fabric in contact with the first molding tool and the part nearby, the densities of the base fiber and the core fiber are higher than those before pressurizing, and the axial lines of the base fiber and the core fiber of the binder fiber are coupled together by the binder component as being oriented to a direction parallel to the circumferential surface. For this reason, the surface layer part of the circumferential surface becomes hard compared with the non-woven fabric before heating and pressurizing. Also, since the axial line directions of the base fiber and the core fiber of the binder fiber are oriented to the direction parallel to the circumferential surface, wear resistance is increased compared with the state in which the axial lines of the base fiber and the binder fiber are oriented to random directions.

As such, on the surface layer part of the circumferential surface of the exterior component 11g according to the seventh embodiment of the present invention, a hard part having a high wear resistance compared with other parts is formed. This part becomes the "first part 111g". The first part 111g is a part having densities of the base fiber and the core fiber of the binder fiber higher than those of other parts (and higher than that of the non-woven fabric 2 before pressurizing and heating), also having the axial lines of the base fiber and the core fiber of the binder fiber oriented to the direction parallel to the surface as a whole (at least having a high ratio of the base fiber and the core fiber of the binder fiber with their axial lines oriented to the direction parallel to the surface), and having the base fiber and the core fiber of the binder fiber bound together by the binder component.

On the other hand, the part of the non-woven fabric 2 in contact with the second molding tool and the part nearby do not reach a temperature in the first temperature band. For this reason, in these parts, the binder component of the binder fiber is not molten. Therefore, these parts have physical properties of the non-woven fabric before heating and pressurizing (for example, easy deformability). As such, a soft part compared with the first part is formed in the part in contact with the second molding tool and the part nearby (that is, on the inner circumferential surface side). This part becomes the "second part 112g". In other words, the second part 112g is a part where the binder component is not molten and having the properties of the non-woven fabric before pressurizing and heating.

Furthermore, in the part of the non-woven fabric 2 reaching the temperature in the first temperature band, a part on an inner circumferential surface side from the part becoming the first part 111g becomes the "third part 113g". In the third part 113g, as with the first part 111g, the base fiber and the core fiber of the binder fiber are bound together by the molten and solidified binder component. For this reason, the third part is harder than the second part 112g. However, the degree of compressive deformation is smaller than that of the first part 111g and the axial line orientation of the axial lines of the base fiber and the core fiber of the binder fiber is not significantly changed from the orientation before heating and pressurizing (that is, the structure is not such that the axial lines are oriented to random directions or "are oriented to the direction parallel to the circumferential surface as a whole"). For this reason, the third part 113g is softer than the first part 111g.

As such, the third part 113g having an intermediate hardness between those of the first part 111g and the second part 112g is formed between the first part 111g and the second part 112g (in other words, to an inner circumferential surface from the first part 111g).

Note that the dimensions of the first part 111g (here, when the circumferential component 11g according to the seventh embodiment of the present invention is regarded as a "cylinder", the dimensions refer to dimensions in a direction at a right angle to an axial line direction of the "cylinder"; the same applies to the following) can be changed by adjusting either one or both of a heating time and a heating temperature in the process of heating and pressurizing the non-woven fabric 2. That is, when the heating time is extended or the heating temperature is increased, the dimensions of the first part 111g are increased. On the other hand, when the heating time is shortened or the heating temperature is lowered, the dimensions of the first part 111g are decreased.

Furthermore, the dimensions of the first part 111g can be changed by varying the dimensions of the non-woven fabric 2 before being formed on the exterior component according to the seventh embodiment of the present invention. That is, when the dimensions of the non-woven fabric 2 are increased, the degree of compressive deformation of the non-woven fabric 2 is increased in the process of pressurizing the non-woven fabric 2 during heating. For this reason, the base fiber and the binder fiber of the non-woven fabric oriented to the direction parallel to the circumferential surface of the exterior component 11g are increased. With this, the dimensions of the first part 111g are increased. On the other hand, when the dimensions of the non-woven fabric 2 to be mounted are decreased, the degree of compressive deformation of the nonwoven fabric 2 is lowered in the process of pressurizing the non-woven fabric 2 during heating. For this reason, the base fiber and the binder fiber of the non-woven fabric 2 oriented in the direction parallel to the circumferential surface of the exterior component 11g are decreased. With this, the dimensions of the first part 111g are decreased.

Still further, the dimensions of the second part 112g and the third part 113g of the exterior accommodation component 11g according to the seventh embodiment of the present invention can be changed by adjusting either one or both of the heating time and the heating temperature in the process of pressurizing the non-woven fabric 2 during heating. That is, when the heating time is extended or the heating temperature is increased, the dimensions of the part reaching the temperature in the first temperature band are increased. Therefore, the dimensions of the second part 112g are decreased, and the dimensions of the third part 113g are increased. On the other hand, when the heating time is shortened or the heating temperature is lowered, the part reaching the temperature in the first temperature band is decreased. Therefore, the volume of the second part 112g is increased, and the dimensions of the third part 113g are decreased.

Next, the method of manufacturing the exterior component 11h according to the eighth embodiment of the present invention is described. Note that compared with the method of manufacturing the exterior component 11g according to the seventh embodiment of the present invention, the "certain time" for pressurizing the non-woven fabric 2 during heating is short in the method of manufacturing the exterior component 11h according to the eighth embodiment of the present invention. When the "certain time" is shortened, in the non-woven fabric 2, a part reaching a temperature in the first temperature band is decreased. That is, only the surface layer part of the circumferential surface of the non-woven fabric 2 reaches the temperature in the first temperature band. For this reason, only the part with the axial lines of the base fiber and the core fiber of the binder fiber being oriented to the direction parallel to the surface due to compressive deformation reaches the temperature in the first temperature band. With this, the "first part 111h" is formed on the surface layer part of the circumferential surface of the exterior component according to the eighth embodiment of the present invention, the other parts become the "second part 112h", and no "third part" is formed (refer to FIG. 10(b)). Note that as structures other than this, the structure identical to that of the method of manufacturing the exterior component 11g according to the seventh embodiment of the present invention is applied. Therefore, description is omitted.

Next, the method of manufacturing the exterior component 11i according to the ninth embodiment of the present invention is described. Note that compared with the method of manufacturing the exterior component 11g according to the seventh embodiment of the present invention, the "certain time" for pressurizing the non-woven fabric 2 during heating is long in the method of manufacturing the exterior component 11i according to the ninth embodiment of the present invention. When the "certain time" is extended, the entire non-woven fabric 2 reaches a temperature in the first temperature band. For this reason, the part with the axial lines of the base fiber and the core fiber of the binder fiber being oriented to the direction parallel to the surface due to compressive deformation becomes the first part 111i, and the other parts all become the third part 113i. With this, the "first part 111i" is formed on the surface layer part of the exterior component 11i according to the ninth embodiment of the present invention, the other parts become the "third part 113i", and no "second part" is formed (refer to FIG. 10(c)).

Note that as structures other than this, the structure identical to that of the method of manufacturing the exterior component 11g according to the seventh embodiment of the present invention is applied. Therefore, description is omitted.

Next, the methods of manufacturing the exterior components 11j, 11k, and 11m according to the tenth to twelfth embodiments of the present invention are described. In each of these manufacturing methods, in the process of pressurizing the non-woven fabric 2 during heating, the inner circumferential surface side of each of the formed exterior components 11j, 11k, and 11m is heated. That is, while the structure to be applied the methods of manufacturing the exterior components 11g, 11h, and 11i according to the seventh to ninth embodiments of the present invention is such that the first molding tool 71 includes heating means and the non-woven fabric 2 is heated by the first molding tool 71, the structure to be applied to the methods of manufacturing the exterior components 11j, 11k, and 11m according to the tenth to twelfth embodiments of the present invention is such that the second molding tool 72 includes heating means and the non-woven fabric 2 is heated by the second molding tool 72.

As structures other than this, the structure identical to those of the methods of manufacturing the exterior components 11g, 11h, and 11i according to the seventh to ninth embodiments of the present invention is applied. Therefore, description is omitted.

And, the method of manufacturing the exterior component 11j according to the tenth embodiment of the present invention corresponds to the method of manufacturing the exterior component 11g according to the seventh embodiment. For this reason, the mechanism in which the first part 111j, the second part 112j, and the third part 113j are formed in the exterior component 11j according to the tenth embodiment of the present invention is identical to that of the method of manufacturing the exterior component 11g according to the seventh embodiment of the present invention, except that the structure is such that the inner circumferential surface side and the circumferential surface side are reversed to each other.

Also, the method of manufacturing the exterior component 11k according to the eleventh embodiment of the present invention corresponds to the method of manufacturing the exterior component 11h according to the eighth embodiment. For this reason, the mechanism in which the first part 111k and the second part 112k are formed in the exterior component 11k according to the eleventh embodiment of the present invention and no third part is formed is identical to that of the method of manufacturing the exterior component 11h according to the eighth embodiment, except that the structure is such that the inner circumferential surface side and the circumferential surface side are reversed to each other.

Furthermore, the method of manufacturing the exterior component 11m according to the twelfth embodiment of the present invention corresponds to the method of manufacturing the exterior component 11i according to the ninth embodiment of the present invention. For this reason, the mechanism in which the first part 111m and the third part 113m are formed in the exterior component 11m according to the twelfth embodiment of the present invention and no second part is formed is identical to that of the method of manufacturing the exterior component 11i according to the ninth embodiment, except that the structure is such that the inner circumferential surface side and the circumferential surface side are reversed to each other.

The exterior components 11g, 11h, 11i, 11j, 11k, and 11m according to the respective embodiments of the present invention achieve the following operations and effects.

That is, in each of the exterior components 11g, 11h, 11i, 11j, 11k, and 11m according to the respective embodiments of the present invention, a relevant one of the first parts 111g, 111h, 111i, 111j, 111k, and 111m, which are parts having a certain hardness, and a relevant one (ones) of the second parts 112g, 112h, 112j, and 112k and/or the third parts 113g, 113i, 113j, and 113m, which are part softer than the first parts 111g, 111h, 111i, 111j, 111k, and 111m, are formed integrally from an identical material (=an identical non-woven fabric 2). In other words, in each of the exterior components 11g, 11h, 11i, 11j, 11k, and 11m according to the respective embodiments of the present invention, a relevant one of the first parts 111g, 111h, 111i, 111j, 111k, and 111m, a relevant one of the second parts 112g, 112h, 112j, and 112k, and a relevant one of the third parts 113g, 113i, 113j, and 113m, the first, second, third parts having different hardnesses, are formed integrally from the identical material (=the identical non-woven fabric 2).

And, the first parts 111g, 111h, 111i, 111j, 111k, and 111m, which are hard parts, can be each provided with either one or both of (1) a function of protecting a certain part of the wire or the bundle of wires of the wire harness (=a function of a "protector") and (2) a function of preventing the wire or the bundle of wires of the routed wire harness from deviating from the routed position, in other words, keeping the shape of the wire or the bundle of wires of the wire harness in a certain shape (=a function of a "shape keeping member"). On the other hand, the second parts 112g, 112h, 112j, and 112k and the third parts 113g, 113i, 113j, and 113m, which are soft parts, can be provided with one or a plurality of functions of (3) a function of preventing or suppressing the occurrence of an unusual noise (=a function of a "muffler material" or a "soundproofing material", (4) a function of preventing a shock from being given to the wire or the bundle of wires of the wire harness (a function of a "cushioning material"), and (5) a function of preventing transmission of heat to the wire or the bundle of wires of the wire harness (=a function of a "heat insulating material"). Furthermore, the exterior components according to the respective embodiments of the present invention can be provided as a whole with (6) a function of gathering the bundle of wires of the wire harness to prevent them from coming apart (=a function of a "binding material").

As such, with one type of material and the common process, the exterior components 11g, 11h, 11i, 11j, 11k, and 11m according to the respective embodiments of the present invention having any of the functions of a shape keeping member, a protector, a muffler material, a cushioning material, a soundproofing material/a muffler material, a heat insulating material, and a binding material can be formed. That is, with one type of material and the common process, accommodation components having different use purposes or functions can be produced. Furthermore, with one type of material and common process, the exterior components 11g, 11h, 11i, 11j, 11k, and 11m having a plurality of functions among these functions can also be formed. For example, a shape keeping member or an accommodation component having a cushioning function, a muffler/soundproofing function, and a heat insulating function can be formed from one type of material with the same process.

Therefore, according to the exterior components 11g, 11h, 11i, 11j, 11k, and 11m in accordance with the respective embodiments of the present invention, even a plurality of types of exterior components having different functions are formed, these can be formed from a common material. With this, commonality of materials of the exterior components 11g, 11h, 11i, 11j, 11k, and 11m can be achieved, and therefore the number of types of material can be decreased and thus material inventory can be easily managed. Also, even when a plurality of different types of the exterior components 11g, 11h, 11i, 11j, 11k, and 11m are formed, a common manufacturing method and a common facility for manufacture can be used. For this reason, a reduction in cost required for a facility for manufacture, commonality of manufacturing facilities, and flexibility can be achieved.

Also, the first parts 111g, 111h, 111i, 111j, 111k, and 111m, the second parts 112g, 112h, 112j, and 112k, and the third parts 113g, 113i, 113j, and 113m of the exterior components 11g, 11h, 11i, 11j, 11k, and 11m according to the respective embodiments of the present invention achieve the following operations and effects.

That is, since the first parts 111g, 111h, and 111i are hard compared with the non-woven fabric 2 before being formed, each first part can keep the shape of the certain part (particularly, the shape of axial lines) of the wire or the bundle of wires of the wire harness accommodated in a relevant one of the exterior components 11g, 11h, 11i, 11j, 11k, and 11m according to the respective embodiments of the present invention in a certain shape. Also, even if a foreign substance contacts or collides with the circumferential surface from outside, the first parts 111g, 111h, and 111i can prevent the foreign substance from directly contacting or colliding with the certain part of the accommodated wire or the bundle of wires, thereby protecting the certain part of the wire or the bundle of wires.

The second parts 112g, 112h, 112j, and 112k have physical properties and physical structure of the non-woven fabric 2 before pressurizing and heating, and are softer than the first parts 111g, 111h, and 111i. The third parts 113g and 113i are harder than the second parts 112g and 112h, but are softer than the first parts 111g, 111h, and 111i. For this reason, even if vibration or shock is given to the exterior components 11g, 11h, and 11i according to the seventh to ninth embodiments of the present invention, the second parts 112g and 112h and the third parts 113g and 113i can mitigate the vibration or shock to prevent or suppress transmission the vibration or shock to the certain part of the accommodated wire or the bundle of wires of the wire harness. As such, the second parts 112g and 112h and the third parts 113g and 113i each function as a cushioning material.

Also, since the second parts 112g and 112h and the third parts 113g and 113i are soft, even if another member contacts or collides with these parts, a collision sound or the like does not occur. As such, the second parts 112g, 112h, 112j, and 112k and the third parts 113g, 113i, 113j, and 113m each function as a soundproofing material. And, since the second parts 112g and 112h and the third parts 113g and 111i can be said as soft porous parts, even when an unusual sound is generated, the generated unusual sound can be absorbed. As such, the second parts 112g and 112h and the third parts 113g and 113i each function as a muffler material.

Furthermore, the second parts 112g and 112h and the third parts 113g and 113i are in a state where fibers are intertwined with each other, and contain air inside. For this reason, thermal conductivity is small compared with that of a filled-core (=an inside-filled) object. Therefore, transmission of heat from outside of the exterior components 11g, 11h, and 11i according to the seventh to ninth embodiments of the present invention to the certain part of the accommodated wire or the bundle of wires of the wire harness can be prevented or suppressed. For this reason, damage by heat to the certain part of the accommodated wire or the bundle of wires of the wire harness can be prevented or suppressed. As such, the second parts 112g and 112h and the third parts 113g and 113i each have a function as a heat insulating material.

Next, operations and effects for each embodiment of the present invention are as follows.

In the exterior components 11g, 11h, and 11i according to the seventh to ninth embodiments of the present invention, the first parts 111g, 111h, and 111i are formed on the surface layer part of the circumferential surface. Since the first parts 111g, 111h, and 111i have a high wear resistance, even if a friction occurs between the exterior component and an external member, it is possible to prevent or suppress wear of the exterior components 111g, 111h, and 111i. For this reason, it is possible to prevent or suppress wear of the second parts 112g and 112h, the third parts 113g and 113i, and the certain part of the wire or the bundle of wires 12.

Also, the certain part of the accommodated wire or the bundle of wires of the wire harness elastically makes contact with the second part 112g or the third part 113i. For this reason, even if vibration, shock, or the like is given to the exterior components 11g, 11h, and 11i, it is possible to prevent the certain part of the accommodated wire or the bundle of wires of the wire harness from colliding with another member other than the second part 112g or the third part 113i. For this reason, the occurrence of a collision sound (a sound that sounds like an unusual sound) produced by the certain part of the wire or the bundle of wires of the wire harness colliding with any member can be prevented. As such, the second parts 112g and 112h and the third parts 113g and 113i each function as a soundproofing material.

In the exterior components 11j, 11k, and 11m according to the tenth to twelfth embodiments of the present invention, the second parts 112j and 112k or the third part 113m is exposed to the circumferential surface. With this structure, the second parts 112j and 112k or the third part 113m of the exterior components 11j, 11k, and 11m may contact with another member adjacently present outside. For this reason, even if vibration, shock, or the like is given to the exterior components 11j, 11k, and 11m and another adjacent member, the occurrence of a collision sound (a sound that sounds like an unusual sound) with another adjacent member can be prevented. As such, the second parts 112j and 112k and the third part 113m each function as a soundproofing material.

Also, like the exterior components 11h and 11k according to the eighth embodiment and the eleventh embodiment of the present invention, in the structure in which no third part is formed, the function as a cushioning material can be particularly improved. That is, except the relatively hardest first parts 111h and 111k, all parts are a relevant one of the relatively softest second parts 112g and 112k, and the dimensions of the second parts 112g and 112k are increased. For this reason, the function as a cushioning material preventing transmission of shock and vibration to the certain part of the accommodated wire or the bundle of wires of the wire harness is increased.

On the other hand, like the exterior components 11i and 11m according to the ninth embodiment and the thirteenth embodiment of the present invention, in the structure in which no second part is formed and only the first parts 111i and 111m and the third parts 113i and 113m are formed, each of the third parts 113i and 113m are hard compared with the second part, and therefore the strength of the exterior components 11i and 11m can be improved. Also, the function of keeping the accommodated wire or the bundle of wires of the wire harness can be increased.

And, like the exterior components 11g and 11j according to the seventh embodiment and the tenth embodiment of the present invention, by forming both of the second parts 112g and 112j and the third parts 113g and 113j, an improvement in strength and an improvement in the function of keeping the wire or the bundle of wires of the wire harness can be achieved. Also, the function as a cushioning material can be provided (note that while the third parts 113g and 113j each have the function as a cushioning material, the effect of weakening shock is larger herein than the structure in which only the third parts 113g and 113j are formed).

Also, according to the exterior components 11g, 11h, 11i, 11j, 11k, and 11m in accordance with the respective embodiments of the present invention, the following operations and effects can be achieved compared with a structure using an injection-molded product.

First, the molding tool 7 experimentally used in forming each of the exterior components 11g, 11h, 11i, 11j, 11k, and 11m according to the respective embodiments of the present invention has a simple structure and is thus inexpensive, compared with a molding tool for manufacturing an injection-molded product. For this reason, compared with the structure of using an injection-molded product, a reduction in facility cost can be achieved. Furthermore, in the exterior components 11g, 11h, 11i, 11j, 11k, and 11m according to the respective embodiments, a material (=the non-woven fabric) inexpensive compared with an injection-molded product can be applied, and therefore a reduction in material cost can be achieved.

Still further, in the process of forming these exterior components 11g, 11h, 11i, 11j, 11k, and 11m, the operation is easy compared with a method of causing a certain part of the wire 12 or the bundle of wires 12 to fit in an injection-molded product.

Still further, these exterior components 11g, 11h, 11i, 11j, 11k, and 11m are formed from the non-woven fabric 2, the weight can be made light compared with an injection-molded product. That is, while the injection-molded product is a filled-core solid (=a solid with its inside filled), each of the exterior components 11g, 11h, 11i, 11j, 11k, and 11m formed from the non-woven fabric 2 is not a completely filled-core solid but contains air therein. For this reason, the weight of each of the exterior components 11g, 11h, 11i, 11j, 11k, and 11m can be made lighter.

Still further, since these exterior components 11g, 11h, 11i, 11j, 11k, and 11m are formed of the non-woven fabric, they can be easily deformed compared with an injection-molded product. For this reason, when an injection-molded product is designed, the dimensions and shape are required to be considered according to fluctuations, due to tolerance, in shape and dimensions of a space where wires are routed. For this reason, designing is complex. By contrast, the exterior components 11g, 11h, 11i, 11j, 11k, and 11m formed from the non-woven fabric 2 can absorb tolerance by being deformed. For this reason, fluctuations due to tolerance in designing are not required to be considered.

Still further, these exterior components 11g, 11h, 11i, 11j, 11k, and 11m achieve the following operations and functions compared with the structure in which a resin tape is coiled around a certain part of the wire or the bundle of wires.

An operation of coiling a resin tape around a certain part of the wire or the bundle of wires takes time and effort. Moreover, finished quality of the wire harnesses tends to be varied, thereby posing a problem in managing and keeping quality. Furthermore, the structure in which a resin tape is coiled around the circumference of the certain part of the wire or the bundle of wires has a problem in which the finished product does not look good.

By contrast, the method of forming the exterior components 11g, 11h, 11i, 11j, and 11k in accordance with the respective embodiments of the present invention is as described above and, compared with the operation of coiling a resin tape, time and effort for this operation can be omitted.

Also, fluctuations of the finished wire harness solid can be eliminated, and quality can be easily managed and kept. Furthermore, appearance with quality equivalent to that of the structure of applying an injection-molded product can be obtained, thereby achieving an effect of good looking.

Still further, when these exterior components 11g, 11h, 11i, 11j, 11k, and 11m each have the function of a shape keeping member, a reduction in the number of operation processes of operation of routing the wire harnesse inside a vehicle or the like, a reduction in the number of components, and light weight can be achieved, which are specifically described as follows.

Conventionally, in a general operation of routing a wire harness, a branch line and a main line of the wire harness are disposed along a certain path set in a routing target member, and then are fixed to a certain member by a clamp or the like. Here, if the branch line and the main line of the wire harness are easily deformed, the following problems occur. First, in order to prevent the routed the main line and branch line of the wire harness from deviating from a certain path of the certain member, many clamps are required. Furthermore, with the main line and the branch line of the wire harness being routed, it is required to prevent any floating part from being produced. That is, if the branch line or the main line of the wire harness is in a floating state, the line may contact or collide with another member due to vibration or the like during use and may be damaged, and also an unusual sound may occur. For this reason, the main line and the branch line of the wire harness are required to be routed over the entire length along the routing target member so as not to produce a floating part. With this, the routing path of the main line and branch line of the wire harness is limited by the shape of the routing target member and, for example, detouring or the like is required, thereby possibly increasing the lengths of the main line and the branch line of the wire harness. When the lengths of the main line and the branch line of the wire harness are increased, an increase in component cost and an increase in weight of the wire harness are invited, and also handling of the wire harness becomes inconvenient.

By contrast, in the structure in which the exterior components 11g, 11h, 11i, 11j, 11k, and 11m according to the respective embodiments of the present invention are used, the following operations and effects can be achieved. First, the certain part of the wire or the bundle of wires of the wire harness accommodated in the exterior components 11g, 11h, 11i, 11j, 11k, and 11m is kept in a certain shape (=the shape of the routing path), thereby reducing the number of clamps. Furthermore, since the certain part of the wire or the bundle of wires of the wire harness is kept in the certain shape, in the state in which routing is made in the routing target member, at least part of the wire(s) may be in a floating state. That is, even if at least part of the wire or the bundle of wires is in a floating state, the floating part is kept in the certain shape. For this reason, the occurrence of a contact or collision with another member due to vibration, shock, or the like during use can be prevented. Therefore, the occurrence of a damage or an unusual sound can be prevented.

Furthermore, by applying the structure in which "at least part of the branch line and the main line is floated", flexibility of the routing path of the wire or the bundle of wires of the wire harness is enhanced. For this reason, a reduction in the routing path can be achieved. And, by achieving a reduction in the routing path, the length of the wire or the bundle of wires can be shortened. With this, a reduction in component cost and light weight can be achieved, and also handling becomes easy. Also, when the length of the wire or the bundle of wires are shortened, a reduction in time required for routing can be achieved, and also the number of clamps for mounting on the routing target member can be further decreased.

Still further, unlike the structure described in Patent Literature 1, in the exterior component according to each embodiment of the present invention, the form of the bundle of wires (=the shape of the gathered wires, in other words, in which form the wires are gathered) is not restricted. That is, the plurality of wires may be gathered so as to have an approximately circular section as a whole, or may be gathered so as to have an approximately rectangular section. Unlike the structure described in Patent Literature 1, the structure is not restricted to the structure in which a flat circuit body is formed from a plurality of wires.

While each of the embodiments of the present invention has been described in detail above, the present invention is not meant to be restricted to each of the embodiments described above, and can be variously modified within a range not deviating from the gist of the present invention.

In the wire harnesses 1a, 1b, 1c, 1d, 1e, and 1f according to the respective embodiments of the present invention, while the structure is shown in which the exterior components 11a, 11b, 11c, 11d, 11e, and 11f each has an approximately circular sectional shape, the sectional shape of each of the exterior components 11a, 11b, 11c, 11d, 11e, and 11f is not restricted. The sectional shape of each of the exterior components 11a, 11b, 11c, 11d, 11e, and 11f is set as appropriate according to the dimensions and shape of a routing region.

Note that in the description of the wire harnesses 1a, 1b, 1c, 1d, 1e, and 1f according to the respective embodiments, the exterior components 11a, 11b, 11c, 11d, 11e, and 11f having different structures are provided to the wire harnesses 1a, 1b, 1c, 1d, 1e, and 1f, respectively, according to the respective embodiments of the present invention, but this is merely for convenience of description. That is, this does not exclude the structure in which the exterior components 11a, 11b, 11c, 11d, 11e, and 11f having different structures are provided to a main line or a branch line of one wire harness. For example, the structure may be such that a plurality of types of exterior components 11a, 11b, 11c, 11d, 11e, and 11f having different structures are provided to one wire harness. Similarly, the structure may be such that a plurality of types of exterior components 11a, 11b, 11c, 11d, 11e, and 11f having different structures are mounted on one main line or branch line of a wire harness. The position on the main line or the branch line of the wire harness where the exterior component(s) are provided and the structure of each of the exterior components 11a, 11b, 11c, 11d, 11e, and 11f to be provided are set according to the dimensions, shape, and environment of the routing region, the function required for the exterior components, and other factors.

Also, while the structure is shown in which the exterior components 11g, 11h, 11i, 11j, 11k, and 11m according to the respective embodiments of the present invention each have an approximately rectangular sectional shape, the sectional shape is not restricted. The sectional shape of each of the exterior components 11g, 11h, 11i, 11j, 11k, and 11m according to the respective embodiments of the present invention is set as appropriate according to the dimensions and shape of a region where a wire harness is routed.

The invention claimed is:

1. A wire harness comprising a wire or a bundle of wires and an exterior component provided in such a manner that it covers a certain part of the wire or bundle of wires, wherein the exterior component has a part having a certain hardness and a part which is softer than the part having a certain hardness which are formed integrally from an identical material, wherein the part having a certain hardness is formed on the surface of the exterior component and the wire or bundle of wires is surrounded by the part which is softer.

2. The wire harness according to claim 1, wherein the exterior component is formed from a non-woven fabric consisting of thermoplastic materials.

3. The wire harness according to claim 2, wherein the non-woven fabric has a base fiber and a binder fiber, the base fiber consists of a thermoplastic resin material having a certain melting point, the binder fiber has a core fiber and a binder component layer formed on the circumference of the core fiber, the core fiber consists of a thermoplastic resin material having a certain melting point, and the binder component layer consists of a thermoplastic resin material whose melting point is lower than the melting points of the base fiber and the core fiber.

4. The wire harness according to claim 3, wherein in the part having a certain hardness the base fiber and the core fiber of the binder fiber are bound by the binder component and also wherein the densities of the base fiber and the core fiber of the binder fiber are higher when compared with the part which is softer.

5. The wire harness according to claim 4, wherein in the part having a certain hardness the base fiber and the core fiber of the binder fiber are bound by the binder component and also wherein the densities of the base fiber and the core fiber of the binder fiber are higher when compared with the part which is softer.

6. The wire harness according to claim 1, wherein the exterior component is formed from a non-woven fabric consisting of thermoplastic materials.

7. The wire harness according to claim 6, wherein the non-woven fabric has a base fiber and a binder fiber, the base fiber consists of a thermoplastic resin material having a certain melting point, the binder fiber has a core fiber and a binder component layer formed on the circumference of the core fiber, the core fiber consists of a thermoplastic resin material having a certain melting point, and the binder component layer consists of a thermoplastic resin material whose melting point is lower than the melting points of the base fiber and the core fiber.

8. An exterior component of a wire harness which is capable of accommodating a wire or a bundle of wire of a wire harness, the exterior component comprising:
a part having a certain hardness; and
a part which is softer than the part having a certain hardness, the part having a certain hardness and the softer part being formed integrally from an identical material, wherein
the exterior component is made from a non-woven fabric consisting of a thermoplastic material,
the non-woven fabric comprises a base fiber and a binder fiber,
the base fiber is made from a thermoplastic resin material having a certain melting point, and
the binder fiber comprises a core fiber, and a layer of a binder material on the circumference of the core fiber, the core fiber being made from a thermoplastic resin material having a certain melting point, the binder material layer being made from a thermoplastic resin material having a melting point that is lower than the melting points of the base fiber and the core fiber.

9. The exterior component according to claim 8, wherein in the part having a certain hardness the base fiber and the core fiber of the binder fiber are bound by the binder component and also wherein the densities of the base fiber and the core fiber of the binder fiber are higher when compared with the part which is softer.

* * * * *